Sept. 8, 1936.　　　　G. A. ANDERSON　　　　2,053,257
METHOD AND APPARATUS FOR MAKING HANDKERCHIEFS AND LIKE ARTICLES
Filed Feb. 9, 1935　　　13 Sheets-Sheet 2

INVENTOR
Gustave A. Anderson,
By
ATTORNEYS

INVENTOR
Gustave A Anderson.
By
ATTORNEYS

Sept. 8, 1936.  G. A. ANDERSON  2,053,257
METHOD AND APPARATUS FOR MAKING HANDKERCHIEFS AND LIKE ARTICLES
Filed Feb. 9, 1935   13 Sheets-Sheet 5

INVENTOR
Gustave A. Anderson,
ATTORNEYS

Sept. 8, 1936.   G. A. ANDERSON   2,053,257
METHOD AND APPARATUS FOR MAKING HANDKERCHIEFS AND LIKE ARTICLES
Filed Feb. 9, 1935   13 Sheets-Sheet 6
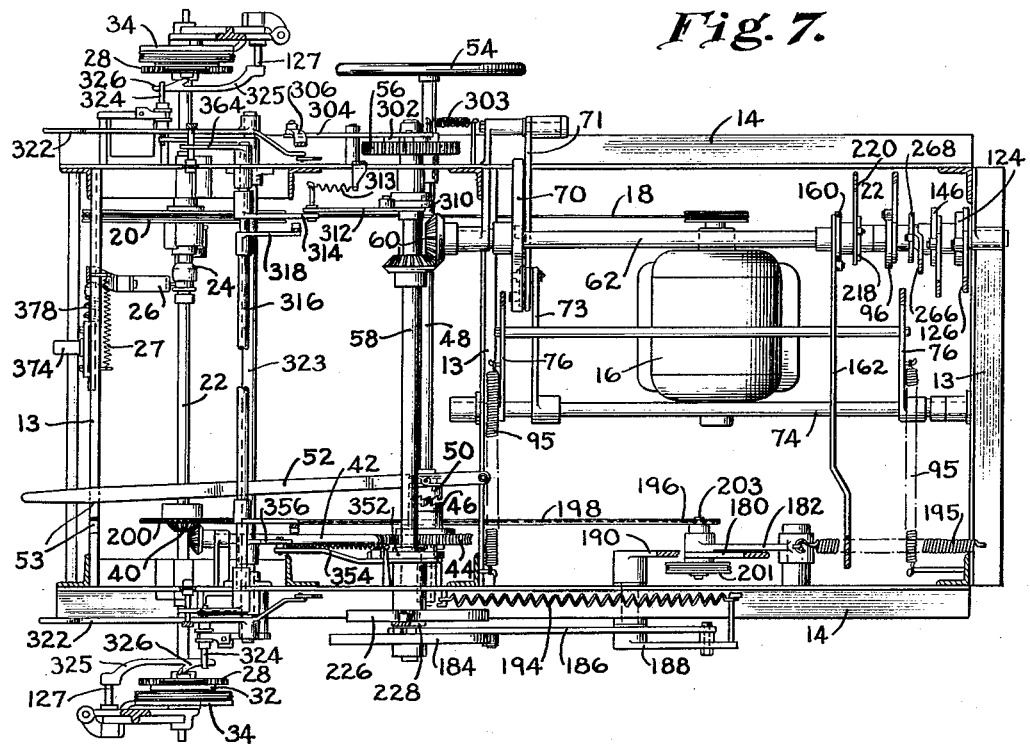
*Fig. 7.*
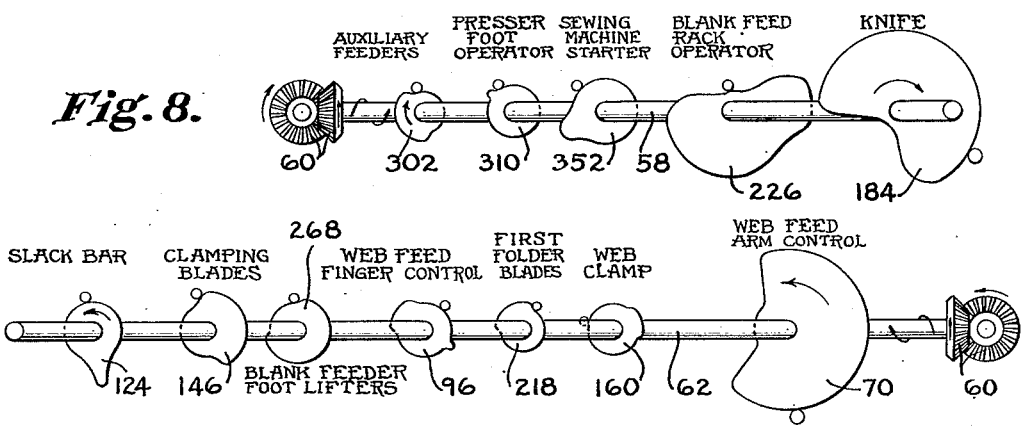
*Fig. 8.*
*Fig. 9.*
INVENTOR
Gustave A. Anderson,
By
ATTORNEYS Sept. 8, 1936.  G. A. ANDERSON  2,053,257
METHOD AND APPARATUS FOR MAKING HANDKERCHIEFS AND LIKE ARTICLES
Filed Feb. 9, 1935  13 Sheets-Sheet 7
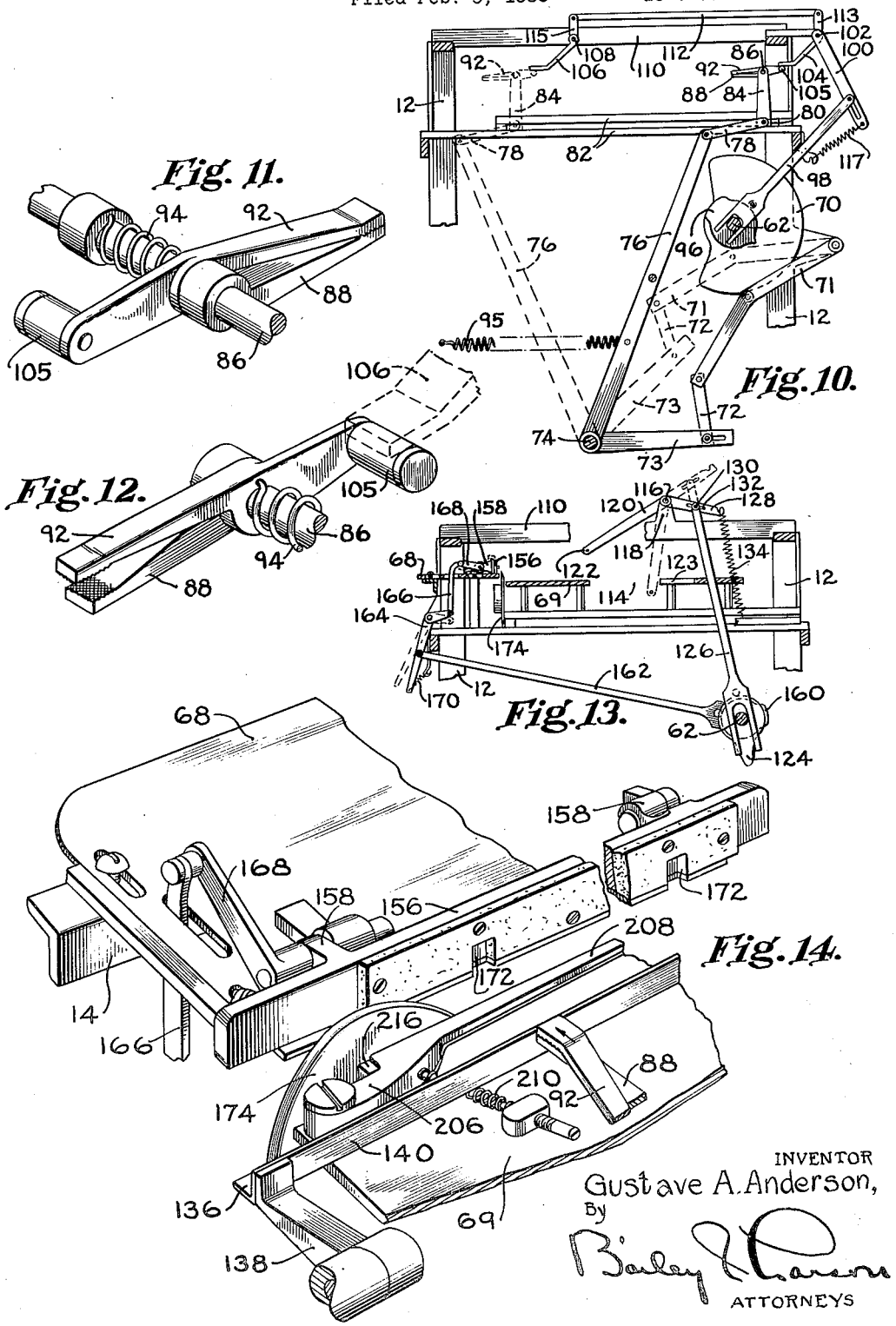
INVENTOR
Gustave A. Anderson,
By
ATTORNEYS Sept. 8, 1936.　　　　G. A. ANDERSON　　　　2,053,257
METHOD AND APPARATUS FOR MAKING HANDKERCHIEFS AND LIKE ARTICLES
Filed Feb. 9, 1935　　　　13 Sheets-Sheet 8
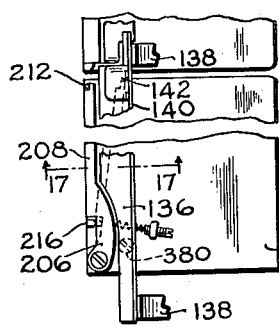
Fig.16.
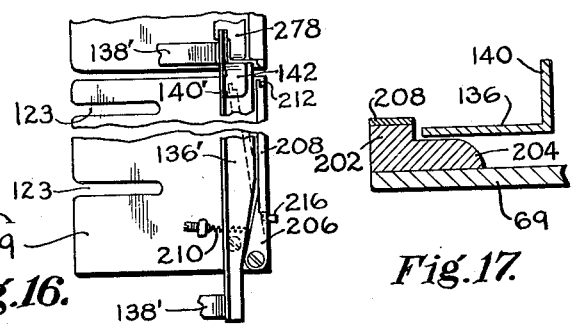
Fig.17.
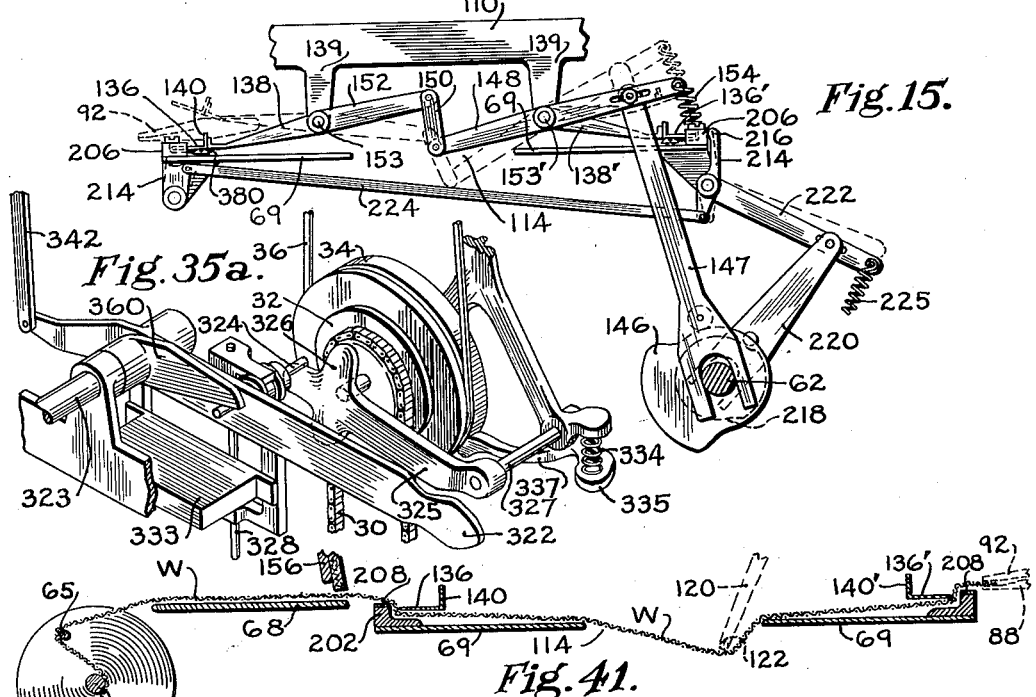
Fig.15.
Fig.35a.
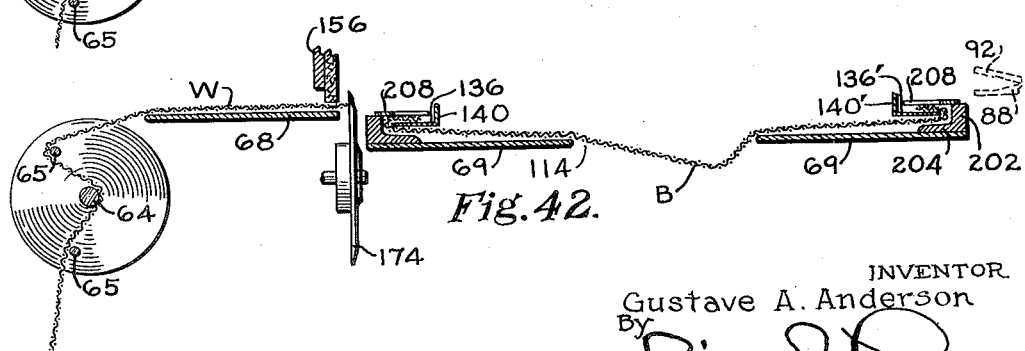
Fig.41.
Fig.42.
INVENTOR
Gustave A. Anderson
By
ATTORNEYS

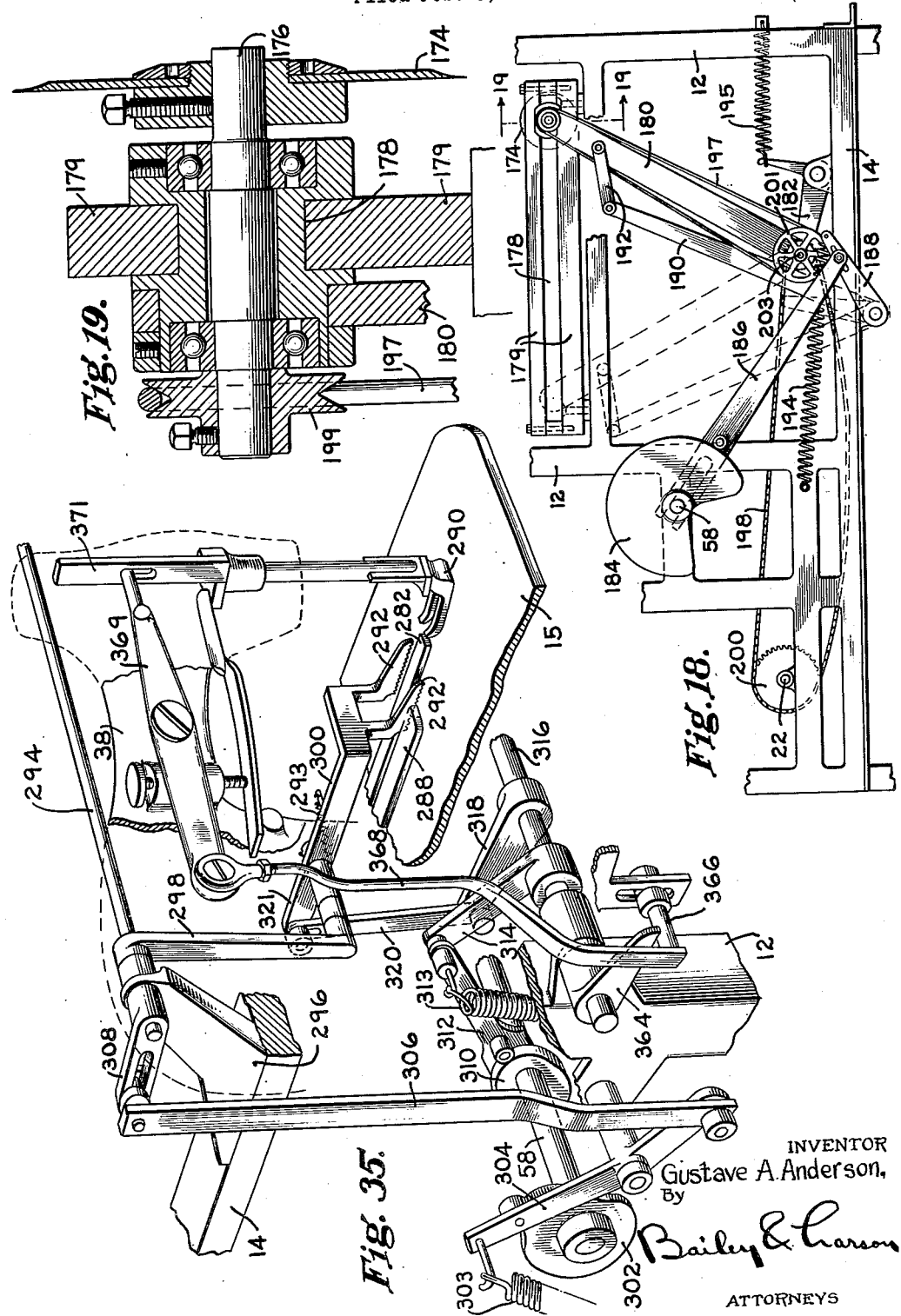

Sept. 8, 1936. G. A. ANDERSON 2,053,257
METHOD AND APPARATUS FOR MAKING HANDKERCHIEFS AND LIKE ARTICLES
Filed Feb. 9, 1935 13 Sheets-Sheet 10
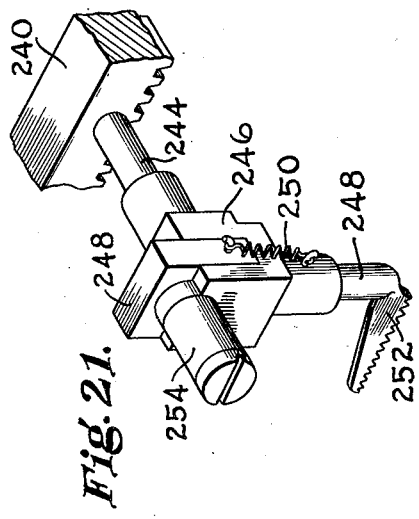
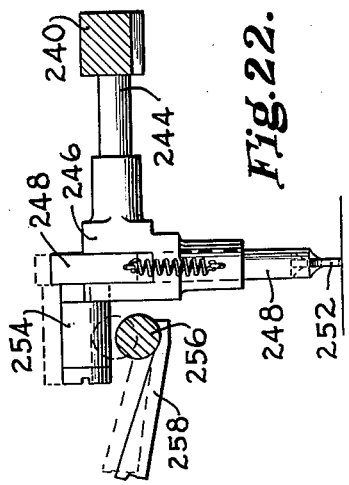
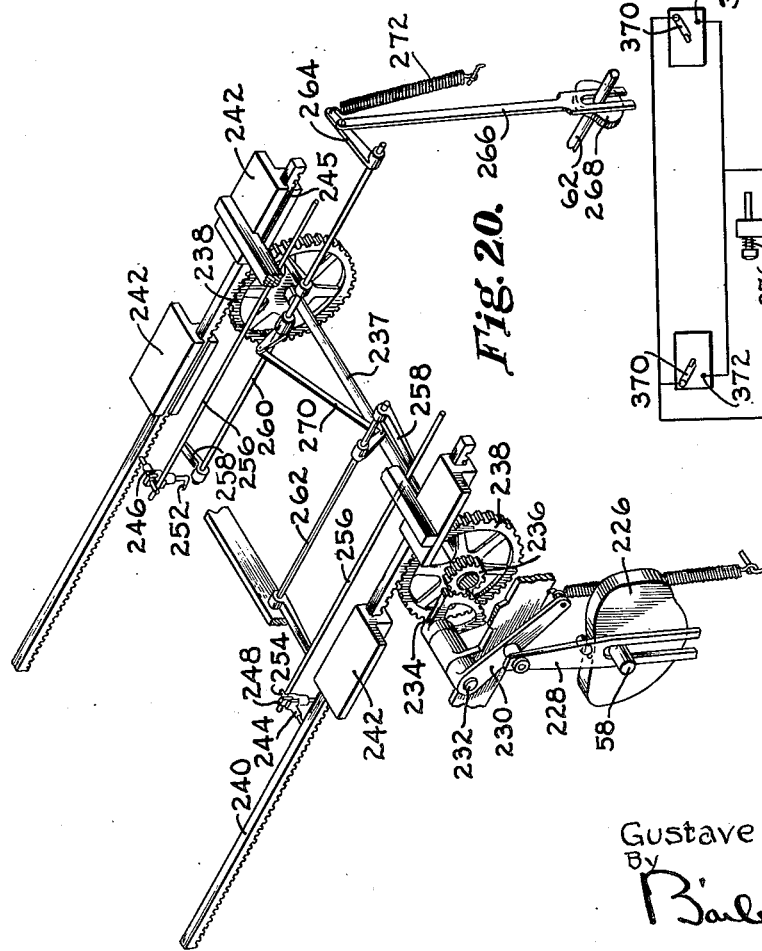
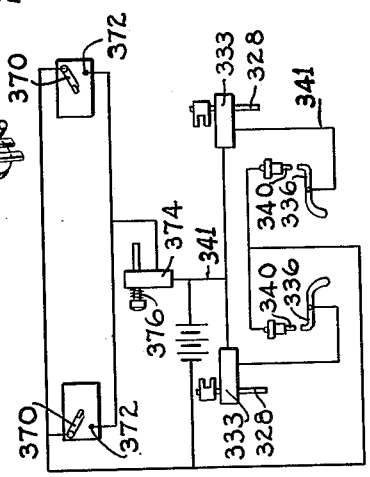
INVENTOR
Gustave A. Anderson,
By
ATTORNEYS Sept. 8, 1936. G. A. ANDERSON 2,053,257
METHOD AND APPARATUS FOR MAKING HANDKERCHIEFS AND LIKE ARTICLES
Filed Feb. 9, 1935 13 Sheets-Sheet 11
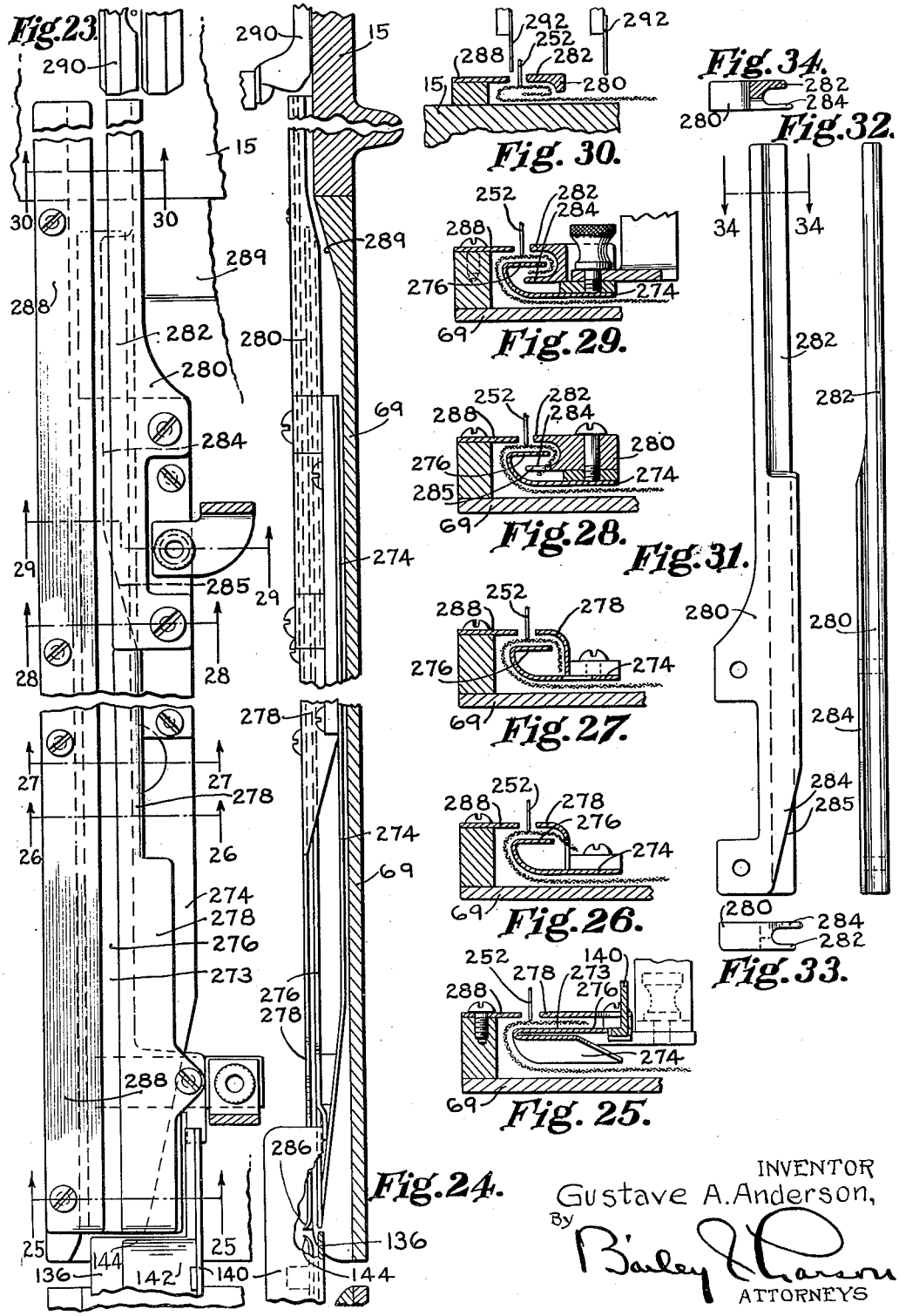
INVENTOR
Gustave A. Anderson,
By
ATTORNEYS Sept. 8, 1936.  G. A. ANDERSON  2,053,257
METHOD AND APPARATUS FOR MAKING HANDKERCHIEFS AND LIKE ARTICLES
Filed Feb. 9, 1935  13 Sheets-Sheet 12
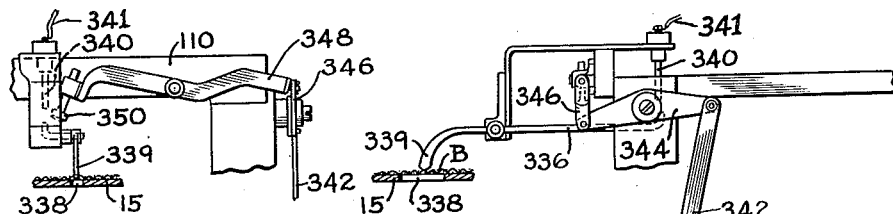
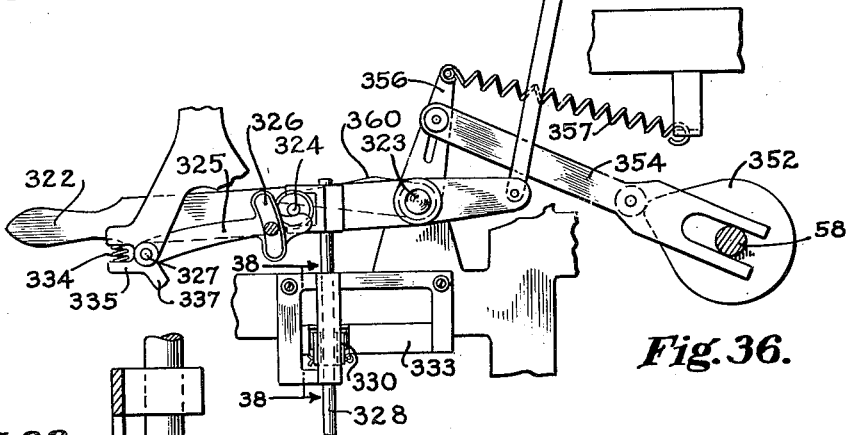
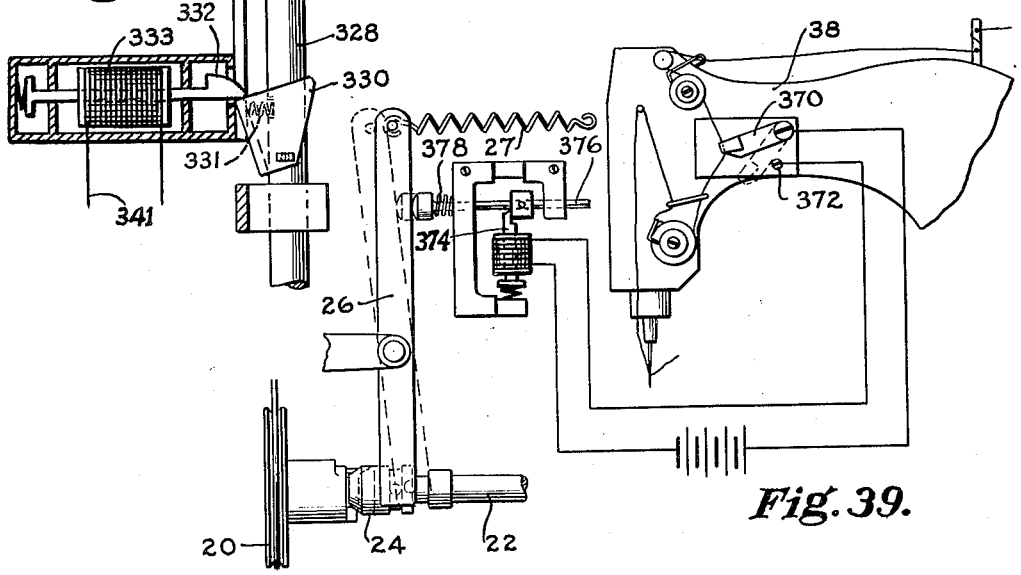
INVENTOR
Gustave A. Anderson,
BY
ATTORNEYS

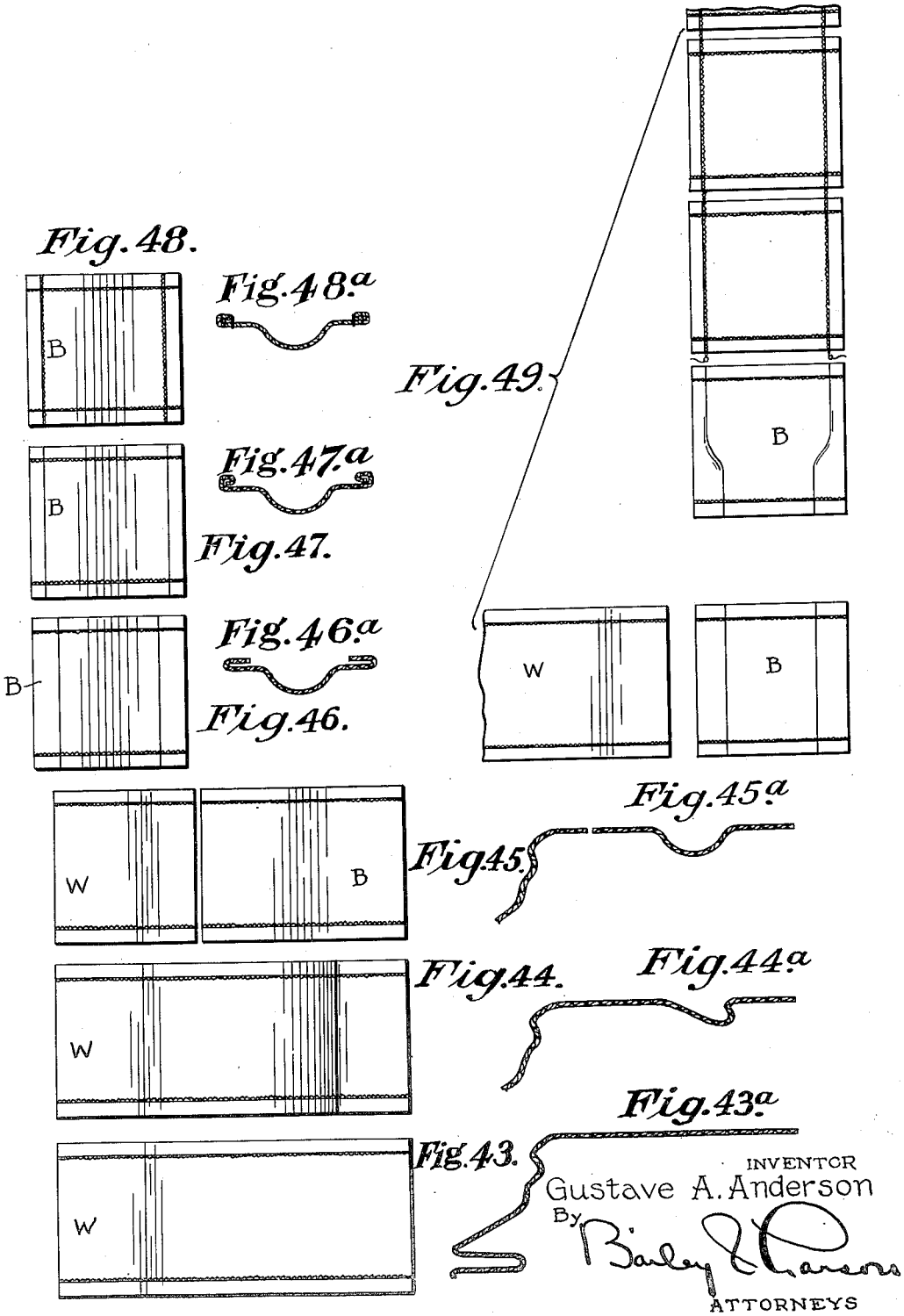

Patented Sept. 8, 1936

2,053,257

UNITED STATES PATENT OFFICE 2,053,257

METHOD AND APPARATUS FOR MAKING HANDKERCHIEFS AND LIKE ARTICLES

Gustave A. Anderson, New York, N. Y., assignor to The International Handkerchief Manufacturing Co., New York, N. Y., a corporation of New York Application February 9, 1935, Serial No. 5,829

77 Claims. (Cl. 112—2)

My invention relates to a machine and process for cutting and stitching articles, and more particularly to an arrangement for cutting, hemming and hemstitching handkerchiefs.

In the manufacture of handkerchiefs, the usual practice is to hem the opposite sides of a web of material, tear or cut off handkerchief lengths from such web, and then feed the lengths individually and by hand to suitable machines which form hems on the two unhemmed edges. This produces a finished handkerchief, but requires a large amount of skillful manual labor.

Various attempts have been made to devise machines which will produce handkerchiefs or similar articles from a web of material automatically and without manual operations, but heretofore such apparatus have been impractical, complicated and unsuccessful.

The primary object of the present invention is to produce handkerchiefs in finished form from a web of material (which is preferably already hemmed along its longitudinal edges) entirely automatically. The steps accomplished include the cutting of handkerchief lengths or blanks from the web, the folding of the edges of the blanks, and the sewing of such folded edges to form the hems.

The machine according to my invention is simple in its design and operation. The working parts are relatively few, and the control of the machine requires no special skill. The power required is slight. Yet the handkerchiefs produced are of high quality. The hems formed will be accurate and neat, and the sizes of the handkerchiefs produced will not vary appreciably.

Many novel features are embodied in my invention, the advantages of which will be discussed below. However, the general plan of operation may be outlined briefly. The web material, previously hemmed on its longitudinal edges either separately or immediately before it enters the machine, is gripped and approximately the required amount to form a handkerchief is drawn across the machine. The exact length is then adjusted by producing a suitable amount of slack in the web portion. The blank is now clamped along its ends and cut off from the web.

After the blank is cut off, and while it is still held in its cut position, the first fold is given to the unhemmed or raw edges. The blank is then moved transversely to the length of the web and its raw edges further folded by suitable devices, from which the edges pass beneath machines which sew both edges simultaneously. The handkerchief is then complete.

An important object of the invention is to measure off from a web blanks of varying size, the edges of which are to be sewn or folded, while keeping these edges in the same position and at the same distance apart regardless of the size of the blank.

One of the principal features is in this arrangement for giving the desired size to the handkerchief or other article. This is accomplished by the joint operation of two parts. First, when the web has been drawn in, a bar extending transversely to the web moves down and creates a slack in the portion which is to form the blank. This measures off the required amount of the web, and by adjustment of the movement of such bar the width of the article can be varied without changing the movement of the grippers or any other part. The blank is clamped and cut, and as the first fold is made while the blank is still held by the clamps the width of the handkerchief is fixed at that time and will not be varied by the hemming operation.

A further purpose accomplished by the slack bar is to provide a certain slack between the raw edges. As the edges are to be sewn simultaneously, this slack is practically necessary. If no slack is provided, any slight difference in speed between the stitching mechanisms will distort and damage the goods. With a slack, however, it is immaterial if such differences in speed occur.

The slack bar also makes it possible to construct the hem turners as straight line continuations of the first fold bars, which increases the simplicity and ease of operation.

Another important part of the device is the auxiliary feeder. In feeding the blank through the folder, the material should be gripped near its edge, that is, on the turned or folded portion. In forming narrow hems, however, such a feeding device could not guide the material sufficiently far as it would strike the presser foot of the machine before the blank is beneath this foot. The auxiliary feed mechanism acts to grip the blank just before it reaches the sewing machine in a line to one side of, and particularly inside of, the presser foot. This mechanism then feeds the blank under the presser foot while it is released by the main blank feeder.

If one sewing machine should run faster than the other, the stopping of both machines only when each had completed its hem would cause one machine to run idle. To avoid this, separate stop mechanisms are provided for each machine so that when a machine completes its hem it stops, regardless of the position of the other machine. I also provide mechanism to stop the whole apparatus when a thread breaks in either of the machines.

It will be evident from the description to follow that the machine is entirely automatic in operation. While the edge of one handkerchief is being sewn, another blank is simultaneously being drawn, measured, cut and folded, so that almost as soon as the first blank has passed through the sewing machines the second is presented to them.

Further objects and advantages of the invention will appear more fully from the following description, particularly when taken in conjunction with the accompanying drawings which form a part thereof.

In the drawings:

Fig. 7 is a cross section on the line 7—7 of Fig. 3.

Figs. 8 and 9 are diagrammatic views of the two cam shafts showing the relative shapes and angular positions of the various cams at the beginning of the operation.

Fig. 10 is an end view of the web feeding mechanism, with the gripper operating mechanism.

Figs. 11 and 12 are detail perspective views of the grippers in closed and open positions respectively.

Fig. 13 is an end view of the slack forming mechanism and the web holding mechanism.

Fig. 14 is a detail perspective of the web holding bar and the adjacent parts.

Fig. 15 is an end view of the blank clamping mechanism and first fold mechanism.

Fig. 16 is a top plan view of parts of the same.

Fig. 17 is an enlarged cross section on the line 17—17 of Fig. 16.

Fig. 18 is a side view of the cutting mechanism.

Fig. 19 is a detail cross section on the line 19—19 of Fig. 18.

Fig. 20 is a perspective view of the blank feeding mechanism, including the feed jaw control mechanism.

Fig. 21 is a perspective view of the blank feed jaw and its supports.

Fig. 22 is an end view of the same.

Fig. 23 is a top plan view of the left hem folding mechanism.

Fig. 24 is a side elevation of the same.

Figs. 25 to 30 are cross sections on the lines 25—25, 26—26, 27—27, 28—28, 29—29 and 30—30 respectively of Fig. 23.

Figs. 31, 32 and 33 are bottom plan, side and end views respectively of a part of the hem folder.

Fig. 34 is a cross section on the line 34—34 of Fig. 31.

Fig. 35 is a perspective view of the auxiliary feed mechanism and the presser foot operating mechanism.

Fig. 35a is a perspective view of a portion of the sewing machine control mechanism.

Fig. 36 is a side elevation of the sewing machine stop mechanism, circuit breaker and sewing machine restoring mechanism.

Fig. 37 is a front view of a part of the same.

Fig. 38 is a front view of the latch release.

Fig. 39 is an end view of the thread break stop mechanism.

Fig. 40 is a wiring diagram of the electric connections for the sewing machine stop and thread break stop mechanisms.

Figs. 41 and 42 are sections showing the positions of some of the parts after the feeding and measuring and after the cutting and first folding respectively.

Figs. 43 to 49 are sketches showing in plan view the various stages during the operation of the machine. Figs. 43a to 48a are sectional views corresponding to Figs. 43 to 48 respectively.

Figure 1:
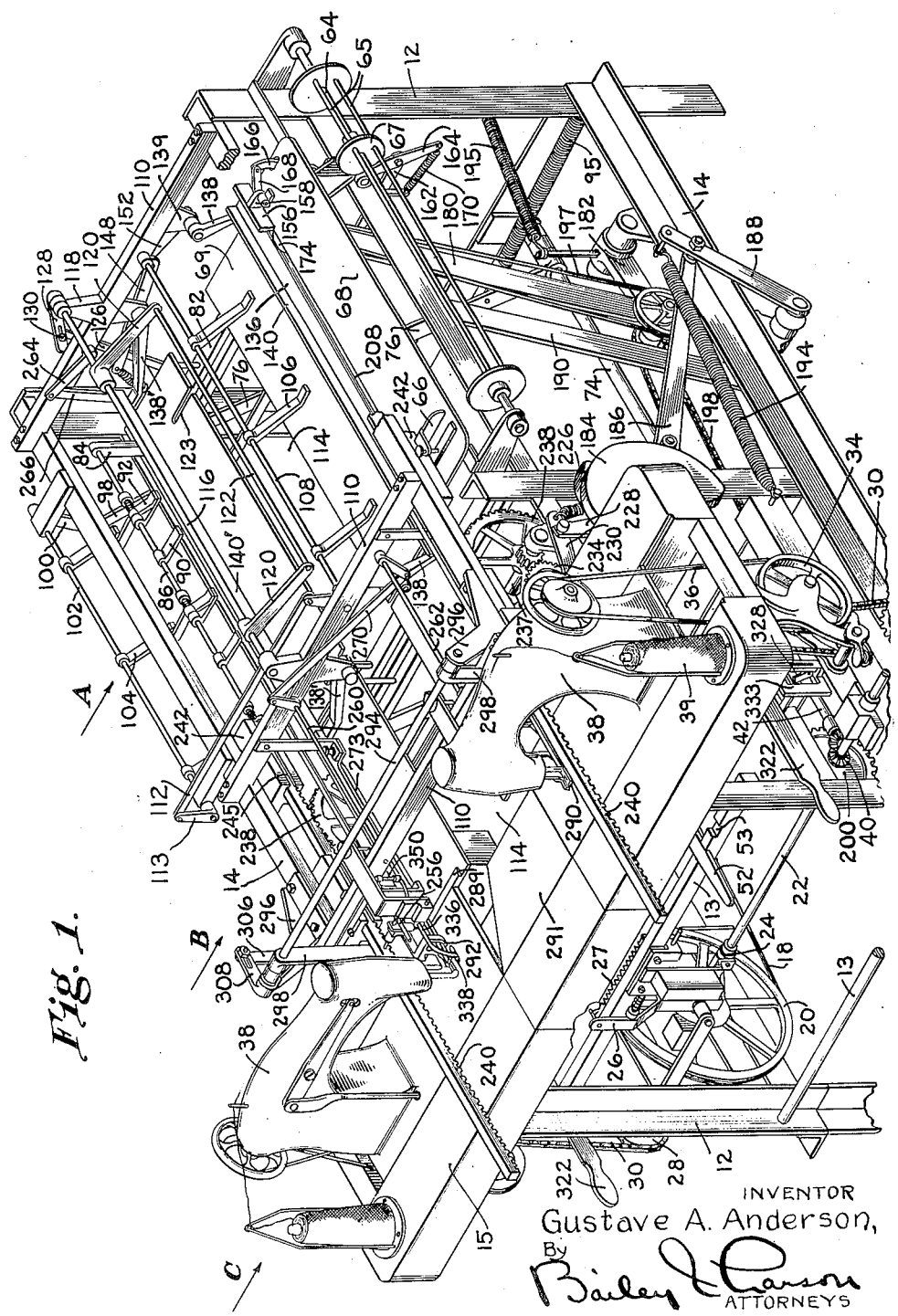
Fig. 1 is a perspective view of a machine embodying my invention, at the beginning of its operation.

The construction of the machine will first be described, and then its operation explained. In general, the apparatus consists of the cutting portion A, the folding portion B, and the sewing portion C. All these are mounted on a single frame consisting of uprights 12, cross members 13 and longitudinal members 14, this frame having a platform 15 at the sewing end C.

Drive and general control

The machine may be operated by an electric motor 16 or any other suitable source of power which through a belt 18 drives pulley 20 loosely mounted on transverse shaft 22 journalled in the frame. On the shaft is a clutch member 24 splined on shaft 22 which may be moved by hand control lever 26 to clutch pulley 20 to the shaft. A spring 27 acts on the lever 26 to hold the clutch member 24 in engaged position. This clutch starts or stops the operation of the whole machine.

Shaft 22 on its ends carries sprockets 28 which through chains 30 turn clutch parts 32. The cooperating clutch parts 34 are pulleys which through belts 36 drive the sewing machines 38 which are supplied with thread from suitable spools 39.

Bevel gear 40 on shaft 22 engages a gear on the longitudinal shaft 42 which through worm gearing 44 drives clutch member 46 freely mounted on transverse shaft 48. The cooperating clutch member 50 is controlled by a hand lever 52 so that shaft 48 may be driven as desired. Lever 52 is engageable with either of two notches 53 in the transverse frame member 13 so that it will be held in either clutching or declutching position. Shaft 48 may be provided with a hand wheel 54 for manual operation.

Shaft 48 also through a pair of gears 56 drives the transverse cam shaft 58. Gears 56 are preferably removable, so that they may be replaced by other gears of different proportions to change the speed of the cam shaft relative to the sewing mechanism. Shaft 58 through bevel gears 60 drives longitudinal cam shaft 62.

Web guide

The web W, preferably already hemmed along its longitudinal edges, as shown in Fig. 43, is led in over a suitable guide and tensioning device comprising an inner bar 64 and two outer bars 65. The web passes over the lower bar 65, then behind the bar 64, and then outwardly around and over the upper bar 65 onto the table, (Fig. 41). This guide preferably is adjustable to fit different widths of material by the setting of one of the end members 67 which may slide longitudinally of the bars 64 and 65. An edge guide arrangement 66 keeps the web in its proper position as it passes across the outer table portion 68, this edge guide consisting of a blade spaced inwardly by about the width of the hem from the edge of the path of the web and thus forming a track for the hem along one edge of the web.

Web feeding mechanism

The feeding of the web is caused by grippers which move transversely across the machine (Figs. 10, 11, 12). A cam 70 on shaft 62 through bell crank lever 71 pivoted on the frame, link 72 and arm 73 rocks a shaft 74 on which arm 73 is fixed near the bottom of frame 12. Arms 76 mounted on this shaft are connected by link 78 to a bar 80 which is mounted to slide across the machine in guides 82, formed of spaced parallel flat bars. Members 84 at the ends of bar 80 carry at their upper ends a fixed rod 86 on which the lower fingers 88 of the gripper are fixedly mounted. Three grippers are provided, and between these are supports 90 to prevent sagging of the edge held by the grippers. The upper fingers 92 are pivoted on rod 86 and are constantly urged into closed or gripping position by springs 94. Springs 95 connected to arms 76 and to the frame normally urge the arms in a direction to advance the gripping fingers, the cam 70 acting for the return movement of the fingers and the actual feeding of the web.

Gripper operating mechanism

The grippers are opened at the proper times to grasp or release the web (Figs. 10, 12). A cam 96 on shaft 62 through link 98 and arm 100 oscillates a rock shaft 102. Fingers 104 fixed on this shaft overlie rollers 105 on the rear ends of movable gripping fingers 92 when the grippers are in the retracted position shown in Figs. 1 and 10. In the advanced position (broken lines, Fig. 10), fingers 92 are operated by fingers 106 on a rock shaft 108 journalled on cross frame bars 110. This shaft is operated in unison with shaft 102 by a link 112 pivoted to arms 113 and 115 fixed on the two shafts 102 and 108 respectively. A spring 117 tends to hold fingers 104 and 106 in raised position.

Measuring and slack-forming mechanism

Central table 69 is provided with a central space 114 extending the whole length of the blank forming and folding parts of the machine. A shaft 116 (Fig. 13) rotatably mounted in ears 118 on cross frame bars 110 carries arms 120 at the end of which is a bar 122 extending transversely of the web W or longitudinally of the machine. This bar can swing downward below table 69 through the space 114 to the broken line position shown in Fig. 13, while arms 120 enter slots 123 in the table 69 so that the possible movement of the bar is very considerable.

A cam 124 on shaft 62 through rod 126 moves arm 128 fixed on shaft 116 and thus rocks the bar 122. The extent of movement of the bar can be regulated by varying the position of a bolt 130 at the end of rod 126 in a slot 132 in arm 128. Spring 134 connected to the end of arm 128 normally tends to hold the bar 122 in raised position.

Clamping mechanism

Above the table 69 are clamping blades 136, 136' (Figs. 15, 16, 17) mounted on arms 138, 138' pivoted on ears 139 extending downward from cross frame members 110. Each of these blades is provided at its inner edge with an upstanding flange 140, 140'. At the inner end of each flange, that is, the end nearest the folding and sewing mechanisms, is a guide blade 142 comprising a small member parallel to but slightly spaced above the body of the blade and its inner end bent up as at 144.

These blades are operated jointly by a single cam 146 on shaft 62 which through rod 147, lever 148, link 150 and arm 152 moves the shaft 153 on which arm 138 is mounted. Lever 148 is fixed on the shaft 153' of arm 138'. Thus, both the blades are operated simultaneously. A spring 154 acting on the end of lever 148 tends to hold the blades in raised position.

Web clamping mechanism

Except when the web is being fed forward, it is held motionless by a bar 156 (Figs. 13 and 14) carried on short arms 158 pivoted at the sides of the table 68. A cam 160 on shaft 62 through rod 162, bell crank lever 164, link 166 and arm 168 rigid with arm 158 can raise the clamping bar 156. Spring 170 tends to hold the bar down on the table. The bar is provided with recesses 172 to permit the grippers 88, 92 to seize the edge of the web.

The cutter

Figure 3:
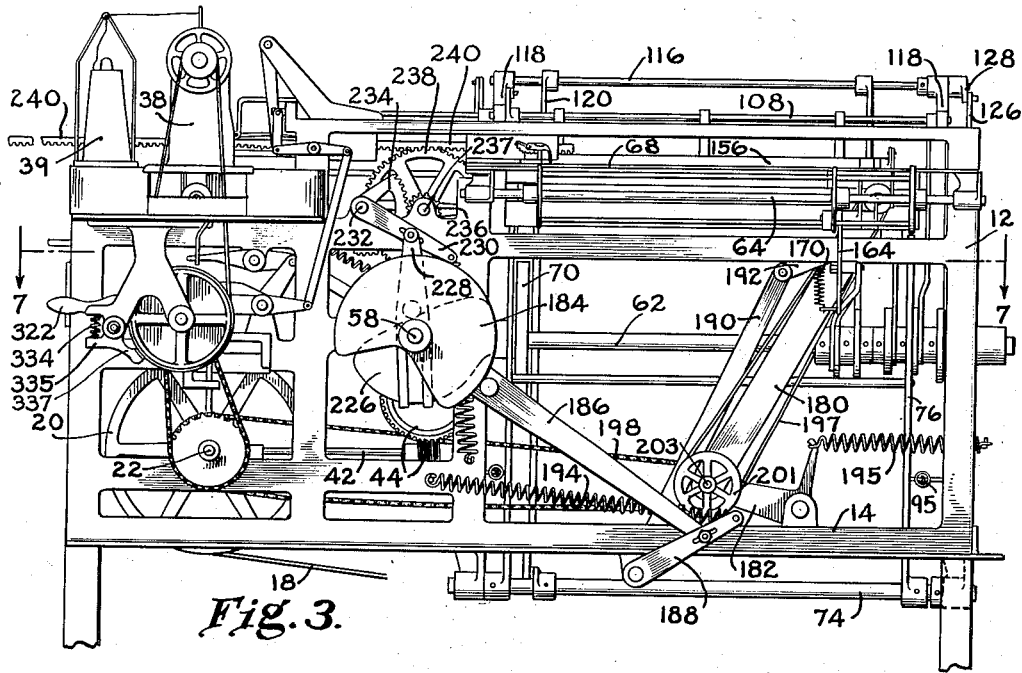
Fig. 3 is a side view of the machine as shown in Fig. 1.
Figure 4:
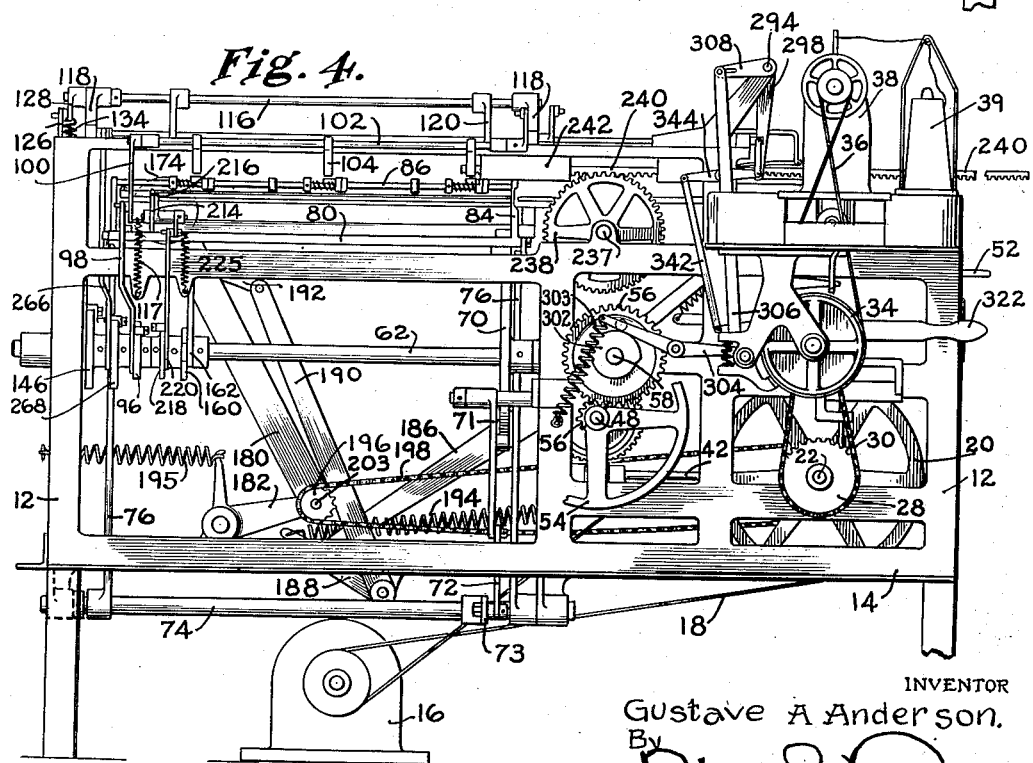
Fig. 4 is a side view from the opposite side.
Figure 5:
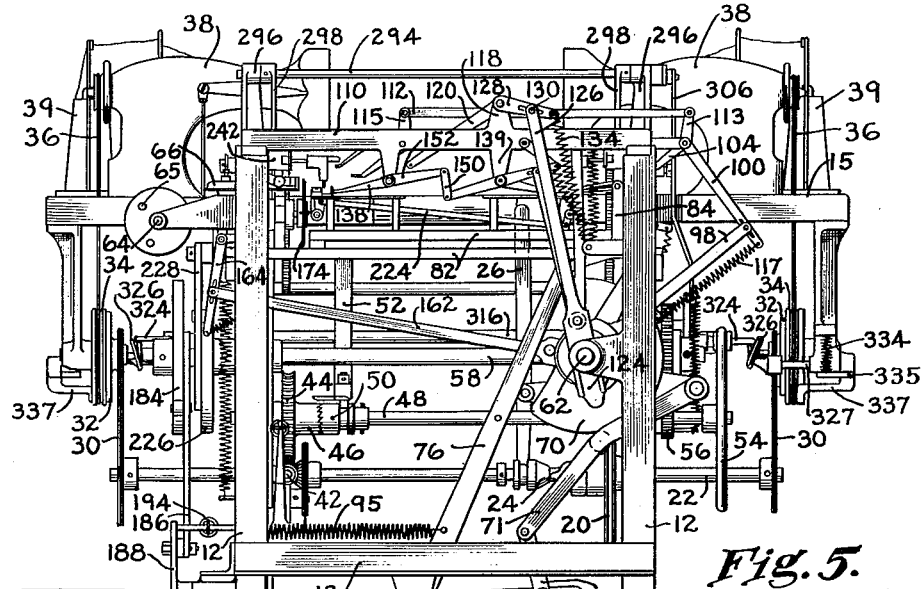
Fig. 5 is an end view from the right end in Fig. 1.

At the proper time, the web W is cut by a knife 174 (Figs. 18 and 19) which passes between clamping blade 136 and web clamping bar 156. This is preferably a rotating disc knife mounted on a shaft 176 which is guided in a slot 178 formed by parallel bars 179 extending transversely to the path of the web. Shaft 176 is mounted in the end of a lever 180 pivoted at its lower end on a lever 182 which is journalled in the longitudinal frame member 14. A cam 184 on shaft 58 through rod 186 rocks arm 188, on the same shaft with which is fixed a lever 190 connected by link 192 to lever 180. A spring 194 tends to move levers 188 and 180 to the left (Fig. 3), while a second spring 195 connected to an arm mounted on the shaft of lever 182 tends to move this lever clockwise (Fig. 1). This combination of springs forms something in the nature of a snap action arrangement, so that when the arm 180 carrying the knife moves past a certain point going in either direction the springs will cause the knife to continue its movement to the end of its path. This arrangement causes the knife to move across the fabric.

The knife is rotated by a belt 197 passing over a pulley 199 on the shaft 176 and a second pulley 201 on a shaft 203 at the pivot point of lever 180 on lever 182 driven by a sprocket 196 and chain 198 from a sprocket 200 on shaft 22.

First fold mechanism

The central portion 69 of the table is at a slightly lower level than the portion 68 onto which the web is fed. At each side of this central portion, and just outside each of the clamping blades 136, 136' is a shoulder 202 running substantially the whole length of the blank forming portion of the machine (Figs. 14, 15, 16, 17, 41 and 42), the upper surface of each shoulder however being below the level of the first table section 68. Inside these shoulders and below the blades 136, 136' are shoulders 204, lower than shoulders 202 by slightly more than the thickness of blades 136, 136' so that when the blades are depressed on a blank the upper surfaces of blades 136, 136' and shoulders 202 are substantially in the same plane.

At one end of the table are pivoted blocks 206 from which thin folding blades 208 extend, these blades normally lying above and in coincidence with shoulder 202. A spring 210 acting on block 206 normally urges blade 208 outward, such movement being limited by a stop 212. It is evident that when blades 136, 136' are depressed, blades 208 can swing in over the clamping blades.

To move the blades 208, I provide levers 214 pivoted at the sides of table portion 68 and having nose portions 216 which engage blocks 206. Levers 214 are operated from shaft 62 by a cam 218, rod 220, lever arm 222 fixed on the same shaft as the right hand lever 214 (Fig. 15) and link 224 connected to the left hand lever 214. A spring 225 acts on arm 222 and normally holds the levers 214 in inoperative position.

Blank feeder

When a blank has been cut and the first fold made, it must then be fed through the folding mechanism B to the sewing machines. This arrangement is shown in Figs. 20 to 22. A cam 226 on shaft 58 through a rod 228 and lever 230 rocks a shaft 232 mounted in the frame members 14 on which is mounted a segmental gear 234. Through a smaller gear 236 meshing with segment 234 and fixed on shaft 237 oscillating movement is imparted to large pinion gear 238 also fixed on the shaft. A rack 240 meshes with gear 238 and is guided in blocks 242 mounted on frame members 14 to slide longitudinally of the machine. Shaft 237 extends across the machine to operate a similar pinion and rack on the other side.

A pin 244 extends laterally inward from each rack and passes during movement of the rack through slots 245 in guide blocks 242. A block 246 on the pin acts as a guide for a vertically sliding feed member 248 normally pressed downward by spring 250. At the bottom of the feed member is the feed jaw 252 which is serrated to give a grip on the cloth.

Feed jaw control

The feed jaw must engage the cloth during the forward movement only. Feed members 248 are therefore provided with laterally extending rollers 254 which run along rods 256 as the feed member travels along its course. Rods 256 are mounted on the ends of arms 258 fixed on shafts 260, 262 journalled in the cross members 110. Rod 260 extends the length of the table and is connected by arm 264 and rod 266 to a cam 268 on shaft 62. Rod 262 is operated in synchronism with rod 260 by a link 270. A spring 272 acting on the end of arm 264 normally tends to hold the arms and rods 256 in lowered position, so that the feed foot 252 can engage the blank.

Folding mechanism

In line with the outer edge of clamping blade 136, 136' is the outer edge of folder guide member 273 (Figs. 23 to 30). This consists of a flat base 274 and an inwardly bent hem guiding section 276. A guide blade 278 overlies the front end of the hem guide, and its free end is bent upwardly. Guide blade 278 develops into a folding member, being gradually curved until it assumes the rectangular shape shown in Fig. 27. Blade 278 is mounted on base 274, and is slightly spaced at all points from section 276 so as to leave a passage of the type indicated in the drawings.

A guide block 280 is also mounted on base 274 at the end of blade 278 (Figs. 31 to 34). This block has a flange 282 forming a continuation of blade 278 and a second flange 284 which gradually increases in width as shown in Figs. 23 and 31 at 285.

Guide member 278 has its end slightly turned up as at 286 to guide the blank beneath the folder.

Parallel to and slightly spaced from the edge of blade 278 is a member 288 which thus forms a slot or track through which the feed jaw 252 engages the blank.

The larger part of the table section 69 which lies beneath the folding devices is at a slightly lower level than the sewing machine table 15. Where the two tables meet, the table section 69 has an upwardly inclined surface 289 extending up to the level of the table 15. The central portion 291 of the table 15 slopes downwardly as indicated in Fig. 1 below the level of the table 69.

Auxiliary feed

The main blank feeding mechanism does not carry the blank completely up to the presser foot 290 of the sewing machine. The production of narrow hems would be impossible if this were done. I therefore provide an auxiliary feed shown in Fig. 35. This consists of a pair of feeding jaws 292 which are located one on each side of the presser foot 290. These jaws are moved down onto the cloth, then forward, then raised and then moved backward by the mechanism to be described.

A rock shaft 294 is mounted in uprights 296 on frame members 14. Levers 298 fixed on this shaft carry at their lower ends pivoted levers 300 on which the jaws 292 are mounted. Shaft 294 is oscillated by a cam 302 on shaft 58 through lever 304, link 306 and arm 308 fixed on shaft 294.

A cam 310 on shaft 58 operates through rod 312 and arm 314 to rock the transverse shaft 316. Arms 318 on shaft 316 are connected by links 320 to the inner ends 321 of levers 300 to impart rocking movement to such levers so as to raise or lower the feeding jaws. A pin and slot connection is provided between links 320 and lever arms 321. This allows play which permits the jaws 292 to be held in constant engagement with the cloth on the table by spring 293 during their forward movement, in spite of the arcuate movement of the pivot point of lever 300 at the end of lever 298. The outermost of the jaws moves in substantially the same line as the main feeding jaw 252 or, in other words, in line with the track between members 278 and 288.

A spring 303 normally acts on lever 304 to hold the jaws 292 in retracted position. A spring 313 acts on lever 314 and tends to hold the jaws in raised, non-feeding position.

The sewing machines

The sewing machines are entirely conventional and need not be described, except that of course right and left hand machines will be used. In making handkerchiefs I use machines which hemstitch, but for other purposes different stitches might be used.

Sewing machine stop mechanism

When the sewing machine reaches the end of a hem on one article, it must be stopped until a second blank reaches it. This is preferably accomplished by electricity.

Levers 322 pivoted on the frame at 323 through pins 324 move arms 325 mounted on shaft 327. Arms 325 carry cams 326 which control the clutches between the driven clutch portions 32 and the pulleys 34 (Figs. 36, 37, 38). A vertically sliding rod 328 is connected to pin 324. A latch member 330 on this rod normally urged outwardly by a small spring 331 engages beneath the movable member 332 of a suitable electric latch mechanism 333. When the lever 322 is depressed, cam 326 is pushed down by pin 324 and causes clutch 32, 34 to engage. Latch 330 holds the lever depressed and the clutch engaged. A spring 334 engages nose 335 integral with lever 337 also fixed on shaft 327. This spring normally urges cam 326 to disengaging position. The end of lever 337 is formed to engage the periphery of pulley 34, and when the cam 326 rises to disengage the clutch the lever 337 will engage the pulley under the action of spring 334 and brake the same to prevent overrunning. If a current of electricity now passes through latch 332, the lever will be released and will rise to disengage the clutch.

Pivoted on the frame adjacent the presser foot of the sewing machine is a lever 336 having a downwardly bent end or nose 339 which can enter a depression 338 in the table surface. The nose 339 is weighted so as to overbalance the other end of the lever 336. The other end of lever 336 is connected as a part of an electric circuit which also includes a contact 340 just above the lever and which controls latch 332. A wire 341 extends from contact 340 and is connected through a battery to latch 333.

As long as there is fabric beneath the end of lever 336, its nose will be held out of recess 338 and its other end away from contact 340. If there is no fabric present under the presser foot, however, the nose will drop into the recess and the lever will close the electric circuit, thus releasing the corresponding lever 322 and rendering the sewing machine operating on that side of the blank inoperative.

*Circuit breaker*

In order to prevent the continued flow of current through the circuit so closed, or sparking at the contact 340, I break the circuit as soon as lever 322 rises. To an extension of lever 322 is connected a link 342 which through lever 344 and link 346 operates a lever 348 pivoted on the cross frame member 110. The free end of lever 348 carries a button 350 directly over lever 336. When lever 322 rises, button 350 depresses the lever 336 and thus breaks the circuit at contact 340. Depression of lever 322 to put the sewing machine back in operation raises button 350 and lever 336 can then return to its normal position to which it is urged by the weight of its nose portion.

*Sewing machine restoring mechanism*

Shaft 58 carries a cam 352 which through a rod 354 and arm 356 rocks shaft 323, on which levers 322 are pivoted. Arms 360 fixed on shaft 323 are engageable with pins 324 which extend on both sides of levers 322. Obviously the rotation of shaft 323 will at the proper time depress the levers 322 until the clutches and latches reengage. If now a fresh blank has been fed to the presser foot, lever 336 will be held in raised position and the sewing machines will continue to operate. A spring 357 acts on the arm 356 and normally holds the levers 360 in raised position.

*Presser foot operator*

Shaft 316 also carries a lever 364 which engages a pin 366 connected by a rod 368 to the usual knee operated presser foot mechanism, consisting of a pivoted lever 369 connected to the presser foot post 371. Oscillation of shaft 316 by cams 310 will thus cause the presser foot to be raised and lowered at the proper times to receive the edge of a blank as it is fed forward by the auxiliary jaws 292.

*Thread break stop*

On the face of the sewing machine 38 is a pivoted lever 370 which is held in partly raised position by the thread passing through the machine (Fig. 39). This lever is connected as a part of an electric circuit. If the thread breaks, lever 370 drops to the broken line position shown in Fig. 39 and engages contact 372 which closes a circuit through electric latch 374. This latch normally holds in retracted position a plunger 376 which is pressed outward by spring 378. If the thread breaks, the circuit releases latch 374 and the plunger strikes main clutch control lever 26, moving it and throwing out the clutch 24. The whole machine then stops until the thread is restored. Manual closing of the clutch will then return plunger 376 to its normal, locked position.

*Operation*

At the beginning of the operation, the web of material extends from any suitable source and its end is held beneath the clamping bar 156 (as shown at the left of Fig. 42) which is of course in lowered position. The parts are then in the positions shown in Figs. 1 to 2a. Grippers 88, 92 are in retracted position (Fig. 10), and the gripping fingers are closed. Folding blades 208 are in their normal position overlying shoulders 202 (Figs. 16, 17). Clamping blades 136, 136' (broken lines Fig. 15) and slack bar 122 (Fig. 13) are raised. The knife is in its normal position at the end of the machine. (Fig. 18).

Figure 2:
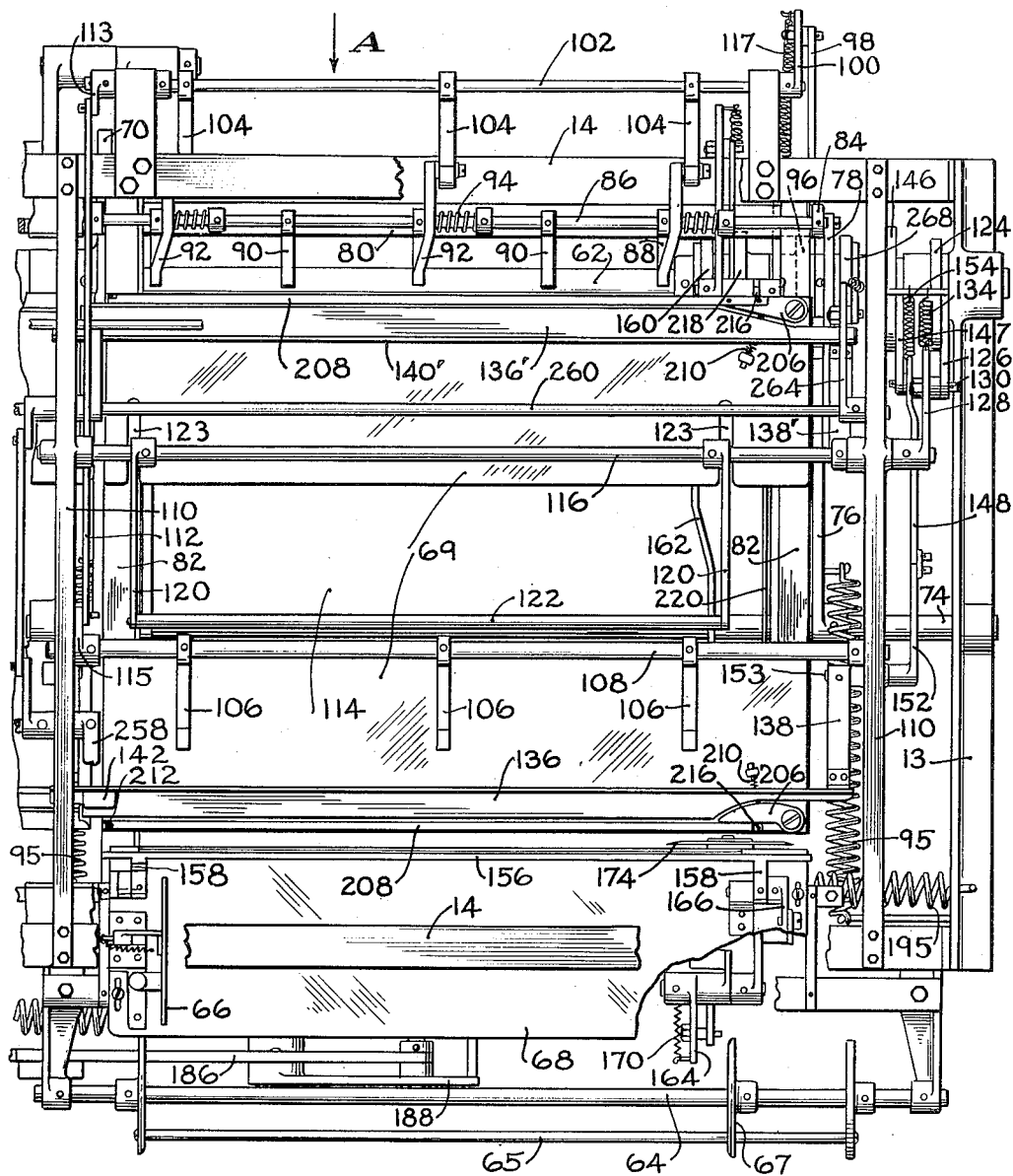
Fig. 2 is a top plan view of the right hand portion (Fig. 1) of the machine, at the beginning of the operation.
Figure 2A:
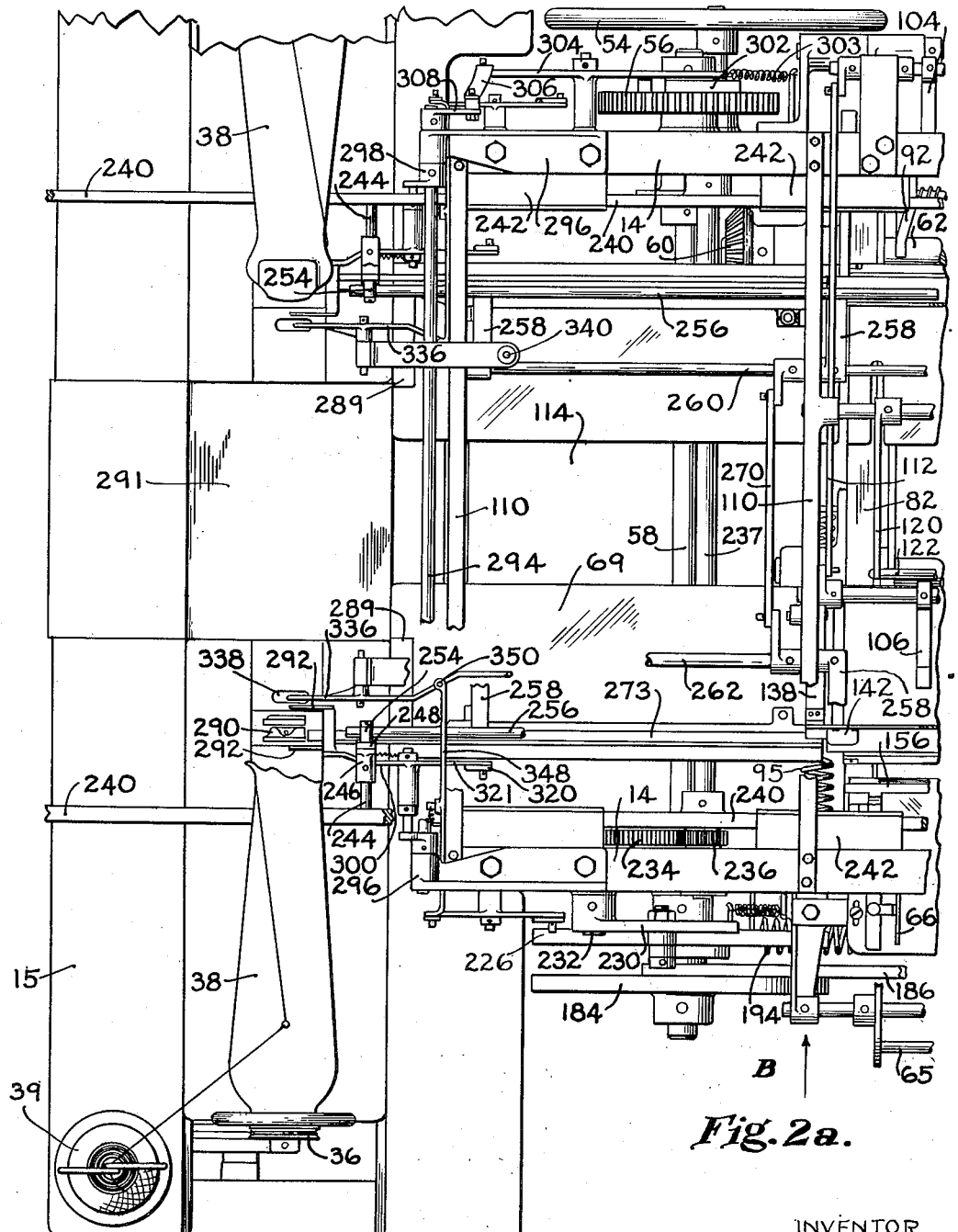
Fig. 2a is a continuation of Fig. 2 showing the left hand portion of the machine.

At this time racks 240 are in their most advanced position (Figs. 2 and 2a). Feeding jaws 252 are raised (as shown in broken lines in Fig. 22). Auxiliary feeding jaws 292 are in their advanced, lowered position. Levers 322 are raised and the clutches 32, 34 are disengaged. Levers 348 are engaged with levers 336 and the contact at 340 is therefore broken.

Now assuming that the motor is started, the blank feed jaw 252 begins to move back until it reaches a position near the opening end of the folding mechanism and just beyond the edge of the web. While this movement is going on, the grippers 88, 92 begin to move forward beneath the clamping blades 136, 136' (as shown in broken lines, Fig. 15) until they enter the notches 172 in the web clamp bar 156. As the grippers move forward and approach the end of the web (broken lines Fig. 10), the gripper operating fingers 106 are depressed, so that the gripping fingers are caused to open, permitting the end of the web to enter between them (Fig. 12). Fingers 106 now rise and permit the grippers to seize the edge of the web.

The web clamp bar 156 now rises, and the grippers swing back to their initial position drawing a portion of the web after them across the table (Fig. 43). During the last part of this movement slack bar 122 begins to swing down and engages the web. After the grippers have completed their motion, the slack bar moves to its final position (broken lines Fig. 13 and Fig. 44). In accordance with the setting of the bolt and slot connection at 130, 132, the bar will swing more or less below and beneath the table 69, and the length of the blank drawn into the machine will vary. This permits the machine to be adjusted to cut blanks of varying dimensions, and particularly in the case of handkerchiefs to produce square articles where the machine is to operate on webs of different widths. In other words, the slack bar serves to measure off a certain amount of the web, which amount is adjustable. Also, it forms a slack in the blank which is desirable for the sewing operation.

As the slack bar nears the end of its downward motion, clamping blades 136, 136' and clamp bar 156 begin to move down onto the web. As soon as the web is clamped (Fig. 15), knife 174 moves across and severs it (Fig. 45), thus forming the blank. During the cutting, the slack bar continues to rise until it reaches its raised position. Gripper operators 104 are now depressed and cause the gripper fingers to release the blank, which is now held only by the clamping blades 136, 136'.

Figure 6:
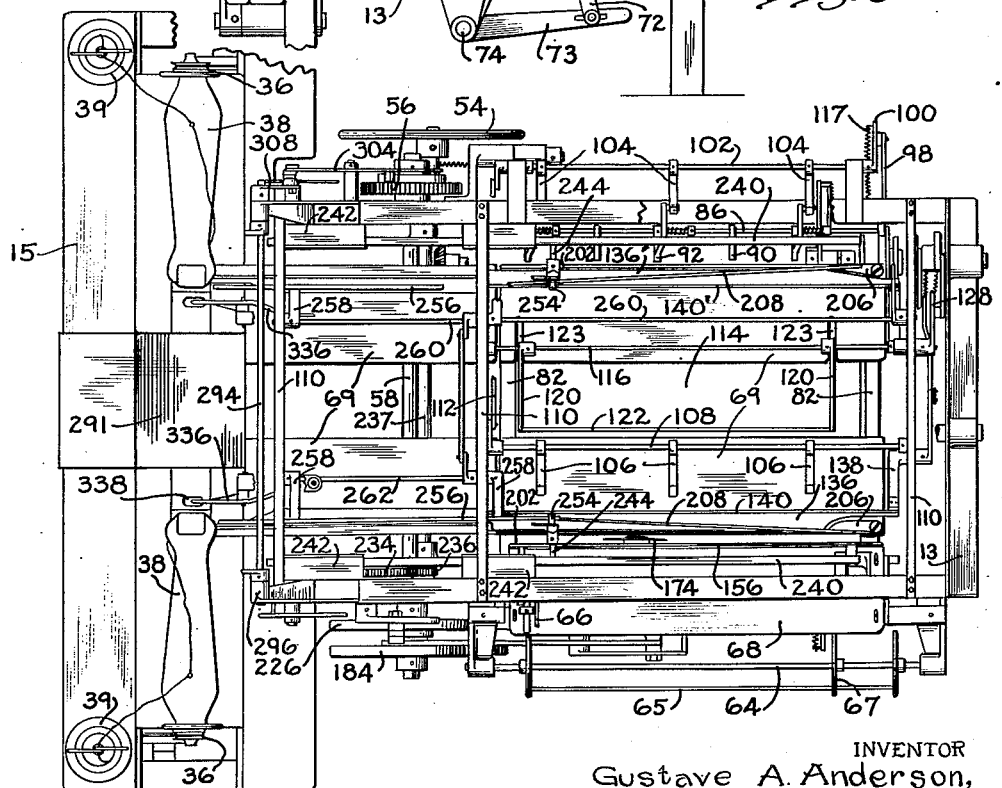
Fig. 6 is a top plan view of the machine in the position in which the blank is about to be fed.

The pressure of the blades 136, 136' carries the body of the blank below the level of the shoulders 202 which therefore cause the edges of the blank to turn upward as shown in Fig. 41. The folding blades 208 now swing over the blades 136, 136' (Figs. 42 and 46) and fold the edges of the cloth over on the clamping blades. During the latter part of this movement, the blank feeding jaw 252 moves to the position shown in Fig. 6 over the front end of the folded edge of the blank. Feed jaws 252 are now permitted to drop down onto the blank and grip the same. Meanwhile, the knife 174 is returning to its original position.

The members 136, 136' have been described above as "clamping blades". This language is not intended to indicate that the blank is tightly gripped by such blades. The blades only exert a sufficient pressure on the web where it lies between the blades and the shoulders 204 to prevent the blank from falling out through the open central portion 114 of the table 69. The pressure is not sufficient to hold the blanks against movement when any considerable force is applied thereto. In other words, these blades serve to hold the blank in position against any slipping or movement caused by its own weight alone, but are not enough to retard the blank in any fashion against the force applied by the feed jaws 252. The downward movement of the clamping blades 136, 136' may be limited by means of adjustable screws 380 beneath the clamping blades.

Feed jaw 252 now moves forward and carries the front of the blank through the folder, in which the hem is folded as shown in Figs. 25 to 30 and 46 to 48 up almost to the sewing machine. These figures show that the blank enters the folder with only the single fold formed by the first fold blades 208 (Figs. 25 and 46). The free or inner edge of this fold is gradually turned down and under the body of the fold, to form a double hem fold (Figs. 26 to 29 and 47). This fold is finally flattened down by the inclined surfaces 289 (Fig. 24). Sewing along the inner edge of this fold by a hemstitching machine will now produce a hem of the usual character (Fig. 48). Jaw 252 is now raised, but auxiliary jaws 292 engage the blank and move forward to feed it beneath the presser foot 290 which has just been raised. The presser foot now drops down on the blank, and the auxiliary feed jaws are raised. Levers 322 are now depressed and the sewing machines begin to operate, sewing the hem which has been formed. The handkerchief leaves the machine hemmed on all sides and in finished condition.

When the levers 322 are depressed, arms 336 drop onto the handkerchief. When the sewing of the hem is completed, the blank moves from under nose 339, which drops and causes the circuit through latch 332 to be closed at contact 340. The lever 322 on that side of the machine rises, the sewing machine stops, and the button 350 moves down to depress the rear end of lever 336 and break the circuit.

As the auxiliary feeding jaws move forward, clamping blades 136, 136' are raised and the machine is returned to the position defined at the beginning of this description. This cycle of operations is then repeated. The machine is so timed that, as the sewing machines finish one handkerchief, the next blank has been cut and folded and is ready to be advanced to the machines.

As the next following blank reaches the presser foot which has been raised, under the action of jaws 292, the cam 352 rocks shaft 323 and thus moves arms 360 downward. These arms through the pins 324 depress levers 322 and cause the clutches 32, 34 to engage. The sewing machines will now continue to operate on the new blank until they reach the ends thereof.

As the first fold made by the blades 208 determines the final width of the handkerchief, this dimension is determined before the blank is moved in any manner from the place where it was cut from the web. The movement through the hem folder will not change the width, since the folded edge merely slides from the clamping blades 136, 136' onto the folder member 273 which is in direct alignment therewith. Satisfactory accuracy in the dimensions of the article can thus be obtained.

In the manufacture of articles with narrow hems, only the inner of the auxiliary feed jaws 292 will grip the article, but this is sufficient to carry the edge beneath the presser foot of the sewing machine.

The slack bar 122 has the further advantage of providing slack between the two edges on which the sewing machines are operating. In the event that one machine moves slightly faster than the other this slack will prevent any tension which might tear the article or damage the machines. The slack bar of course represents a simple, yet accurate method of measuring off an adjustable amount of the web.

Throughout the specification and claims, the terms "transverse" and "longitudinal" as applied to the blank and to the machine, are intended to refer to the vertical and horizontal directions in Fig. 2 respectively; but as applied to the web, these terms have their ordinary meaning.

Furthermore, while I have described the operation and use of the process, the machine and its parts, as applied especially to the manufacture of handkerchiefs, I wish it to be clearly understood that the invention can be used in the production of many other articles, such as bags, towels, sheets and pillow slips; and that while I have described herein one modification and one especial use of the invention, I do not intend to limit myself thereby except within the scope of the appended claims.

I claim:
1. A process for making handkerchiefs which consists in drawing from a web of material a por- tion to form a blank, deflecting an intermediate part of the blank portion from the path of the web through a predetermined distance to measure the blank and to form a slack in the center thereof, clamping the blank adjacent its edges, cutting off the blank from the web, forming a fold along each edge of the blank while so clamped, feeding the blank transversely of the web, further folding the edges of the blank during such feeding operation, and sewing the folded edges of the blank simultaneously while maintaining the slack therebetween.

2. A process for making handkerchiefs which consists in drawing from a web of material a portion to form a blank, deflecting an intermediate part of the blank portion from the path of the web through a predetermined distance to measure the blank and to form a slack in the center thereof, clamping the blank adjacent its edges, maintaining such part of the web deflected, and while it is deflected cutting off from the web a blank portion including said part, feeding the blank transversely of the web, and sewing the edges of the blank simultaneously while maintaining the slack therebetween.

3. A process for making handkerchiefs which consists in drawing from a web of material a portion to form a blank, deflecting an intermediate part of the blank portion from the path of the web through a predetermined distance to measure the blank, clamping the blank adjacent its edges, cutting off the blank from the web, forming a fold along at least one edge of the blank while so clamped, feeding the blank transversely of the web, and sewing the folded edge of the blank.

4. In a process for forming handkerchiefs or the like, the steps of cutting off a portion of the web to form a blank, clamping the blank in the position in which it is cut off from the web, forming folds in the edge portions of the blank substantially parallel to the edges thereof while it is so clamped, feeding the blank transversely to the web, further folding the edges during such feeding operation, and sewing the folded edges of the blank.

5. In a process for forming handkerchiefs or the like, the steps of cutting off a portion of the web to form a blank, clamping the blank in the position in which it is cut off from the web, forming folds in the edge portions of the blank substantially parallel to the edges thereof while it is so clamped, feeding the blank transversely to the web, and sewing the folded edges of the blank.

6. A process for making handkerchiefs or the like which consists in forming a slack in a portion of a web, cutting off such portion to form a blank while maintaining the slack in said blank forming portion, and sewing the edges of such blank simultaneously while maintaining the slack between the edges.

7. A process for making handkerchiefs or the like which consists in forming a slack in a portion of a web, cutting off such portion to form a blank while maintaining the slack in said blank forming portion, and sewing the edges of such blank simultaneously while guiding the blank to move in a straight line transversely to the web so as to maintain the slack between the edges.

8. A process for making handkerchiefs or the like which consists in forming a slack in a portion of a web, clamping such portion of the web near the edges thereof, cutting off such portion to form a blank while maintaining the slack in said blank forming portion, feeding said blank transversely while guiding its edges to move in straight lines, and sewing the edges of such blank simultaneously while maintaining the slack between the edges.

9. A process for making handkerchiefs or the like which consists in clamping a blank, folding the edge portions of the blank substantially parallel to the edges thereof while so clamped, feeding the blank in the direction of the folded edges, further folding the edges during such feeding operation, and sewing the folded edges.

10. In a process in which a blank is formed from a continuous web of material, the method of measuring the blank which consists in deflecting an intermediate part of the blank portion from the path of the web by a predetermined distance, maintaining such part of the web deflected, and while it is deflected cutting off from the web a blank portion including said part.

11. In a process in which a blank is formed from a web of material, the method of measuring the length of the blank which consists in holding the end of the web in a predetermined position, deflecting an intermediate part of the blank portion of the web from the path of the web by a predetermined distance, and cutting off the blank portion from the web at a predetermined lineal distance from the end of the web and on the opposite side of such deflected portion from the end of the web.

12. In a process in which a blank with folded edges is formed from a web of material, the method of measuring the length of the blank and locating the folds therein which consists in holding the end of the web in a predetermined position, deflecting an intermediate part of the blank portion of the web from the path of the web by a predetermined distance, cutting off the blank portion from the web at a predetermined lineal distance from the end of the web, and folding the edges of the blank along lines spaced a predetermined distance from the positions of the end of the web and the point of the cut while holding the body portion of the blank in the position in which it is when cut from the web.

13. A process for making handkerchiefs or the like which consists in drawing off a blank portion from a web of material, clamping such blank portion near the edges thereof, cutting off such portion to form a blank, forming a fold along at least one edge portion of the blank parallel to such edge while the blank is still clamped, then feeding the blank in the direction of the folded edge transversely of the web, and sewing the folded edge.

14. In a process in which a blank is formed from a continuous web of material, a method of measuring a blank which consists in feeding a web longitudinally, holding the end of the web stationary, deflecting a part of the web from the path of the web by a predetermined distance to form a blank portion, and cutting off from the web such blank portion along a line which, at the time when such intermediate part is deflected, is located on the opposite side of such deflected portion from the end of the web and at a fixed lineal distance from the end of the web.

15. A machine for making handkerchiefs or the like comprising means for drawing off from a web a portion of the web to form a blank, means for deflecting an intermediate part of the blank forming portion from the path of the web to form slack in said portion, means for cutting off from the web such blank forming portion while maintaining the slack in said blank forming portion to form a blank, means for feeding the blank transversely of the web, and means for sewing the edges of the web simultaneously while maintaining the slack therebetween.

16. A machine for making handkerchiefs or the like comprising means for drawing off from a web a portion of the web to form a blank, means for deflecting an intermediate part of the blank forming portion from the path of the web by a predetermined distance, means for clamping the blank forming portion near the edges thereof, means for cutting off from the web such blank forming portion while maintaining said intermediate part thereof deflected to form a blank, means for folding the edges of the blank while holding it clamped, means for feeding the blank transversely of the web and simultaneously further folding the edges thereof, and means for sewing the folded edges of the web simultaneously.

17. A machine for making handkerchiefs or the like comprising means for drawing off from a web a portion of the web to form a blank, means for deflecting an intermediate part of the blank forming portion from the path of the web by a predetermined amount to form slack in said portion, means for clamping the blank forming portion near the edges thereof, means for cutting off from the web such blank forming portion while maintaining the slack in said blank forming portion to form a blank, means for folding the edges of the blank while holding it clamped, means for feeding the blank transversely of the web and simultaneously further folding the edges thereof, and means for sewing the folded edges of the web simultaneously while maintaining the slack therebetween.

18. In a machine of the character described, a table, means to clamp a portion of a web which is to form a blank near one edge thereof on said table, means to cut off said blank forming portion from the web, means to fold the edge portion of the blank substantially parallel to the edge thereof while the blank is still held stationary by said clamping means, a sewing machine at the end of the table, and means to feed the blank longitudinally of the table to the sewing machine.

19. In a machine of the character described, a table, means to clamp a portion of a web which is to form a blank near one edge thereof on said table, means to cut off said blank forming portion from the web, means to fold the edge portion of the blank substantially parallel to the edge thereof while the blank is still held stationary by said clamping means, a sewing machine at the end of the table, means to feed the blank longitudinally of the table to the sewing machine, and means engaging the folded edge of the blank during such longitudinal movement of the blank further to fold the edge of the blank.

20. In a machine of the character described, a table, means to clamp a portion of a web which is to form a blank near the edges thereof on said table, means to cut off said blank forming portion from the web, means to hold the end of the web from which the blank has been cut off, means to fold the edge portions of the blank substantially parallel to the edges thereof while the blank is still held stationary by said clamping means, sewing machines at the end of the table, means to feed the blank longitudinally of the table to the sewing machines, and means engaging the edges of the blank during such longitudinal movement of the blank further to fold the edges of the blank.

21. In a machine of the character described, a table, blades movable to clamp a portion of a web which is to form a blank near the edges on said table, means to cut off said blank forming portion from the web, means to fold the edges of the blank over said clamping blades while it is still held thereby, sewing machines at the end of the table, and means to feed the blank longitudinally of the table to the sewing machines.

22. In a machine of the character described, a table, blades movable to clamp a portion of a web which is to form a blank near the edges on said table, means to cut off said blank forming portion from the web, means to fold the edges of the blank over said clamping blades while it is still held thereby, sewing machines at the end of the table, means to feed the blank longitudinally of the table to the sewing machines, and means engaging the edges of the blank during such longitudinal movement of the blank further to fold the edges of the blank.

23. In a machine of the character described, means to cut a blank from a web, means to clamp the blank comprising movably mounted clamping blades, means to fold the edges of said blank over and around the outer edges of said blades, sewing machines, means to feed the folded edges of the blank from said blades to said sewing machines, and means to guide the folded edges during such feeding operation, said guiding means comprising guide members having edges in direct alignment with the edges of said blades.

24. In a machine of the character described, a table, blades movable to clamp a portion of a web which is to form a blank near the edges on said table, means to cut off said blank forming portion from the web, means to fold the edges of the blank over said clamping blades while it is still held thereby, sewing machines at the end of the table, means to feed the blank longitudinally of the table to the sewing machines, and means engaging the edges of the blank during such longitudinal movement of the blank further to fold the edges of the blank, said folding means including blades having their edges aligned with the edges of the clamping blades.

25. In a machine of the character described, a table, means to clamp a portion of a web which is to form a blank near the edges thereof on said table, means to cut off said blank forming portion from the web, means to fold the edge portions of the blank substantially parallel to the edges thereof while the blank is still held stationary by said clamping means, means to feed the blank longitudinally of the table, means engaging the edges of the blank during such longitudinal movement of the blank further to fold the edges of the blank, sewing machines at the end of the table, and means independent of said first feeding means to feed the folded edges of the blank to the sewing machines.

26. In a machine of the character described, a table, means to clamp a portion of a web which is to form a blank near the edges thereof on said table, means to cut off said blank forming portion from the web, means to fold the edge portions of the blank substantially parallel to the edges thereof while the blank is still held stationary by said clamping means, sewing machines, means to feed the blank longitudinally of the table to points adjacent the sewing machines, means engaging the edges of the blank during such longitudinal movement of the blank further to fold the edges of the blank, and means independent of said first feeding means to feed the folded edges of the blank to such sewing machines.

27. In an apparatus of the class described, means for measuring a blank forming portion from a web which comprises means for holding the end of the web in fixed position, means for deflecting an intermediate part of the blank forming portion from the path of the web by a predetermined distance, and means for cutting off from the web such blank forming portion while maintaining said intermediate part thereof deflected.

28. In an apparatus of the class described, means for measuring a blank forming portion from a web which comprises means for holding the end of the web in fixed position, means for deflecting an intermediate part of the blank forming portion from the path of the web by a predetermined distance, and means on the opposite side of said deflecting means from said holding means for cutting the web at a predetermined lineal distance from the end thereof to form a blank.

29. In an apparatus of the class described, means for measuring a blank forming portion from a web which comprises means for holding the end of the web in fixed position, means for deflecting an intermediate part of the blank forming portion from the path of the web by a predetermined distance, said last means being adjustable to vary the amount of deflection, and means on the opposite side of said deflecting means from said holding means to cut the web at a predetermined lineal distance from the end thereof to form a blank.

30. In an apparatus of the class described, means for drawing off from a web a blank forming portion, means movable transversely of the web to deflect an intermediate part of the blank forming portion from the path of the web by a predetermined distance, and means to cut off from the web such blank forming portion while maintaining said intermediate part thereof deflected.

31. In an apparatus of the class described, means for drawing off from a web a blank forming portion, means movable transversely of the web to deflect an intermediate part of the blank forming portion from the path of the web, said last means being adjustable to vary the amount of such deflection, and means to cut off from the web such blank forming portion while maintaining said intermediate part thereof deflected.

32. In an apparatus of the class described, means for drawing off from a web a blank forming portion, a rod extending transversely of the web, means to move said rod to engage the web so as to deflect an intermediate part of the blank forming portion from the path of the web, said last means being adjustable to vary the amount of such deflection, and means to cut off from the web such blank forming portion while maintaining said intermediate part thereof deflected.

33. In an apparatus of the class described, a table, means for drawing off from a web across said table a blank forming portion, a rod above said table extending transversely of the web, said table having an opening therein below said rod, means to move said rod downward to engage the web so as to deflect an intermediate part of the blank forming portion from the path of the web through said space, said last means being adjustable to vary the amount of such deflection, and means to cut off from the web such blank forming portion while maintaining said intermediate part thereof deflected.

34. In an apparatus of the class described, a table, means for drawing off from a web across said table a blank forming portion, a rod above said table extending transversely of the web, said table having an opening therein below said rod, means to move said rod downward to engage the web so as to deflect an intermediate part of the blank forming portion from the path of the web through said space, said last means being adjustable to vary the amount of such deflection, means to clamp the blank forming portion near its edges, means to cut off from the web such blank forming portion to form a blank while maintaining said intermediate part thereof deflected, and means to fold the edges of said blank while it is still held by said clamping means.

35. In an apparatus of the class described, means for drawing off from a web a blank forming portion, means movable transversely of the web to deflect an intermediate part of the blank forming portion from the path of the web, means to cut off from the web such blank forming portion at a predetermined point to form a blank while maintaining said intermediate part thereof deflected, and means to sew the edges of the blank simultaneously.

36. In an apparatus of the class described, means for drawing off from a web a blank forming portion, means movable transversely of the web to deflect an intermediate part of the blank forming portion from the path of the web, means to clamp the blank forming portion near its edges, means to cut off from the web such blank forming portion to form a blank while maintaining said intermediate part thereof deflected, and means to fold the edges of the blank while it is still held by said clamping blades.

37. In an apparatus of the class described, means for drawing off from a web a blank forming portion, means movable transversely of the web to deflect an intermediate part of the blank forming portion from the path of the web, said last means being adjustable to vary the amount of such deflection, means to clamp the blank forming portion near its edges, means to cut off from the web such blank forming portion to form a blank while maintaining said intermediate part thereof deflected, and means to fold the edges of the blank while it is still held by said clamping means.

38. In an apparatus of the character described, a table, a web guide at one side of said table, means to feed a web across the table and to hold the end of the web, said table having an opening centrally thereof, a shaft mounted above said table, arms on said shaft, a slack bar carried by said arms, means to turn said shaft so as to move said slack bar vertically downward through the space in said table to deflect an intermediate part of a blank forming portion of the web lying on said table, and means operable after the movement of said slack bar to cut off from the web the portion drawn across said table by said feeding means.

39. In an apparatus of the character described, a table, a web clamping bar above said table, means to raise and lower said web clamping bar, means to feed a web across the table and to hold the end of the web, said table having an opening centrally thereof, a shaft mounted above said table, arms on said shaft, a slack bar carried by said arms, means to turn said shaft so as to move said slack bar vertically downward through the space in said table to deflect an intermediate part of a blank forming portion of the web lying on said table, and means adjacent said web clamping bar operable after the movement of said slack bar to cut off from the web the portion drawn across said table by said feeding means.

40. In an apparatus of the character described, a table, means to feed a web across said table and to hold the end of the web, said table having an opening centrally thereof, a slack bar movably supported above said table, means to move said slack bar vertically downward through the space in said table to deflect an intermediate part of a blank forming portion of the web lying on said table, and means operable after the movement of said slack bar to cut off from the web the portion drawn across said table by said feeding means.

41. In an apparatus of the character described, a table, a web clamping bar above said table, means to raise and lower said web clamping bar, means to feed a web across the table and to hold the end of the web, said table having an opening centrally thereof, a slack bar movably supported above said table, means to move said slack bar vertically downward through the space in said table to deflect an intermediate part of a blank forming portion of the web lying on said table, and means adjacent said web clamping bar operable after the movement of said slack bar to cut off from the web the portion drawn across said table by said feeding means.

42. In an apparatus of the character described, a table, a web clamping bar above said table, means to raise and lower said web clamping bar, a support mounted for movement across said table, gripping members on said support adapted to engage the end of the web, means at the sides of said table to operate said gripper members to cause the same to engage and disengage the web at suitable intervals, means to reciprocate said support to feed the web across the table, said table having an opening centrally thereof, a slack bar movably supported above said table, means to move said slack bar vertically downward through the space in said table to deflect an intermediate part of a blank forming portion of the web lying on said table, and means adjacent said web clamping bar operable after the movement of said slack bar to cut off from the web the portion drawn across said table by said gripping members.

43. In an apparatus of the character described, a table, a web clamping bar above said table, means to raise and lower said web clamping bar, a support mounted for movement across said table, gripping members on said support adapted to engage the end of the web, means at the sides of said table to operate said gripper members to cause the same to engage and disengage the web at suitable intervals, means to reciprocate said support to feed the web across the table, said table having an opening centrally thereof, a slack bar movably supported above said table, means to move said slack bar vertically downward through the space in said table to deflect an intermediate part of a blank forming portion of the web lying on said table, said last means being adjustable to vary the amount of such deflection and means adjacent said web clamping bar operable after the movement of said slack bar to cut off from the web the portion drawn across said table by said gripping members.

44. In an apparatus of the character described, a table, a web clamping bar above said table, means to raise and lower said web clamping bar, a support mounted for movement across said table, gripping members on said support member adapted to engage the end of the web, means at the side of said table to operate said gripper members to cause the same to engage and disengage the web at suitable intervals, means to reciprocate said support to feed the web across the table, said table having an opening centrally thereof, a shaft mounted above said table, arms on said shaft, a slack bar carried by said arms, means to turn said shaft so as to move said slack bar vertically downward through the space in said table to deflect an intermediate part of a blank forming portion of the web lying on said table, and means adjacent said web clamping bar operable after the movement of said slack bar to cut off from the web the portion drawn across said table by said gripping members.

45. In a machine of the character described, a frame, a table carried by said frame, a support movably guided in said frame to slide across the table, fixed and movable gripping fingers mounted on said support above said table, means at the sides of said table to engage the movable gripper fingers to open and permit closing of said grippers at suitable periods, means to reciprocate said support to feed the web, a pair of arms mounted above the central portion of said table to turn about an axis extending longitudinally of the table, the central portion of said table having an opening therein, a bar carried by said arms and extending longitudinally of the table and transversely of the path of the web, means to move said arms to cause said bar to move downwardly through said opening, thereby to deflect from the plane of the top of the table an intermediate part of the portion of the web overlying the table, and means to cut off a blank from the web.

46. In a machine of the character described, a frame, a table carried by said frame, a support movably guided in said frame to slide across the table, fixed and movable gripping fingers mounted on said support above said table, a web clamping bar above said table, means to raise and lower said web clamping bar, means at the sides of said table to engage the movable gripper fingers to open and permit closing of said grippers at suitable periods, means to reciprocate said support to feed the web, a pair of arms mounted above the central portion of said table to turn about an axis extending longitudinally of the table, the central portion of said table having an opening therein, a bar carried by said arms and extending longitudinally of the table and transversely of the path of the web, means to move said arms to cause said bar to move downwardly through said opening, thereby to deflect from the plane of the top of the table an intermediate part of the portion of the web overlying the table, said moving means being adjustable to vary the swinging motion of said arms, and means adjacent said web clamping bar to cut off a blank from the web.

47. In a machine of the character described, a frame, a table carried by said frame, a support movably guided in said frame to slide across the table, fixed and movable gripping fingers mounted on said support above said table, a web clamping bar above said table, means to raise and lower said web clamping bar, means at the sides of said table to engage the movable gripper fingers to open and permit closing of said grippers at suitable periods, means to reciprocate said support to feed the web, a pair of arms mounted above the central portion of said table to turn about an axis extending longitudinally of the table, the central portion of said table having an opening therein, a bar carried by said arms and extending longitudinally of the table and transversely of the path of the web, means to move said arms to cause said bar to move downwardly through said opening, thereby to deflect from the plane of the top of the table an intermediate part of the portion of the web overlying the table, said moving means being adjustable to vary the swinging motion of said arms, said table having slots therein in alignment with said arms whereby said rod may pass beneath a portion of the table, and means adjacent said web clamping bar to cut off a blank from the web.

48. In a machine of the character described, a frame, a table carried by said frame, a support movably guided in said frame to slide across the table, fixed and movable gripping fingers mounted on said support above said table, a web clamping bar above said table, means to raise and lower said web clamping bar, means at the sides of said table to engage the movable gripper fingers to open and permit closing of said grippers at suitable periods, means to reciprocate said support to feed the web, a pair of arms mounted above the central portion of said table to turn about an axis extending longitudinally of the table, the central portion of said table having an opening therein, a bar carried by said arms and extending longitudinally of the table and transversely of the path of the web, means to move said arms to cause said bar to move downwardly through said opening, thereby to deflect from the plane of the top of the table an intermediate part of the portion of the web overlying the table, said moving means being adjustable to vary the swinging motion of said arms, an arm pivoted on said frame about a transverse axis, and a knife carried by said arm adjacent said web clamping bar to cut off a blank from the web.

49. In a machine of the character described, a frame, a table carried by said frame, a support movably guided in said frame to slide across the table, fixed and movable gripping fingers mounted on said support above said table, a web clamping bar above said table, means to raise and lower said web clamping bar, means at the sides of said table to engage the movable gripper fingers to open and permit closing of said grippers at suitable periods, means to reciprocate said support to feed the web, a pair of arms mounted above the central portion of said table to turn about an axis extending longitudinally of the table, the central portion of said table having an opening therein, a bar carried by said arms and extending longitudinally of the table and transversely of the path of the web, means to move said arms to cause said bar to move downwardly through said opening, thereby to deflect from the plane of the top of the table an intermediate part of the portion of the web overlying the table, said moving means being adjustable to vary the swinging motion of said arms, said table having slots therein in alignment with said arms whereby said rod may pass beneath a portion of the table, an arm pivoted on said frame about a transverse axis, and a knife carried by said last arm adjacent said web clamping bar to cut off a blank from the web.

50. In a machine of the character described, a frame, a table carried by said frame, a support movably guided in said frame to slide across the table, fixed and movable gripping fingers mounted on said support above said table, a web clamping bar above said table, means to raise and lower said web clamping bar, means at the sides of said table to engage the movable gripper fingers to open and permit closing of said grippers at suitable periods, means to reciprocate said support to feed the web, a pair of arms mounted above the central portion of said table to turn about an axis extending longitudinally of the table, the central portion of said table having an opening therein, a bar carried by said arms and extending longitudinally of the table and transversely of the path of the web, means to move said arms to cause said bar to move downwardly through said opening, thereby to deflect from the plane of the top of the table an intermediate part of the portion of the web overlying the table, blank clamping blades adjacent the edges of the table, means to move said clamping blades to engage the web, means adjacent said web clamping bar to cut off a blank from the web, and means to fold the edges of the blank while it is still held by said clamping blades.

51. In a machine of the character described, a frame, a table carried by said frame, a support movably guided in said frame to slide across the table, fixed and movable gripping fingers mounted on said support above said table, a web clamping bar above said table, means to raise and lower said web clamping bar, means at the sides of said table to engage the movable gripper fingers to open and permit closing of said grippers at suitable periods, means to reciprocate said support to feed the web, a pair of arms mounted above the central portion of said table to turn about an axis extending longitudinally of the table, the central portion of said table having an opening therein, a bar carried by said arms and extending longitudinally of the table and transversely of the path of the web, means to move said arms to cause said bar to move downwardly through said opening, thereby to deflect from the plane of the top of the table an intermediate part of the portion of the web overlying the table, blank clamping blades adjacent the edges of the table, means to move said clamping blades to engage the web, means adjacent said web clamping bar to cut off a blank from the web, means to fold the edges of the blank while it is still held by said clamping blades, means to feed the blank along the table, and means to sew the folded edges simultaneously.

52. In a machine of the character described, a frame, a table carried by said frame, a support movably guided in said frame to slide across the table, fixed and movable gripping fingers mounted on said support above said table, a web clamping bar above said table, means to raise and lower said web clamping bar, means at the sides of said table to engage the movable gripper fingers to open and permit closing of said grippers at suitable periods, means to reciprocate said support to feed the web, a pair of arms mounted above the central portion of said table to turn about an axis extending longitudinally of the table, the central portion of said table having an opening therein, a bar carried by said arms and extending longitudinally of the table and transversely of the path of the web, means to move said arms to cause said bar to move downwardly through said opening, thereby to deflect from the plane of the top of the table an intermediate part of the portion of the web overlying the table, blank clamping blades adjacent the edges of the table, means to move said clamping blades to engage the web, means adjacent said web clamping bar to cut off a blank from the web, and means to fold the edges of the blank while it is still held by said clamping blades comprising blades mounted to turn about vertical axes, located outside the clamping blades, the plane of movement of said blades being higher than the upper faces of the clamping blades when in clamping position, whereby said blades may fold the edges of the web over the clamping blades.

53. In a machine of the character described, means to clamp a blank comprising a table, and a blade mounted above said table and movable to clamp a blank on the table, means to fold an edge of said blank over and around the outer edge of said blade, a sewing machine, folding mechanism between said sewing machine and said blade, said folding mechanism including a hem guide member having an edge in direct alignment with the edge of said blade, and means for feeding said blank through said folding mechanism to said sewing machine.

54. In a machine of the character described, means to clamp a blank comprising a table, and blades mounted above said table and movable to clamp a blank on the table, means to fold the edges of said blank over and around the outer edges of said blades, sewing machines, folding mechanism between said sewing machines and said blades, said folding mechanism including hem guide members having edges in direct alignment with the edges of said blades, and means for feeding said blank through said folding mechanism to said sewing machines.

55. In a machine of the character described, means to cut a blank from a web, means to clamp the blank comprising clamping blades movably mounted, means to fold the edges of said blank over and around the outer edges of said blades, sewing machines, folding mechanism between said sewing machines and said blades, said folding mechanism including hem guide members having edges in direct alignment with the edges of said blades, and means for feeding said blank through said folding mechanism to said sewing machines.

56. In a machine of the character described, means to clamp a blank comprising a table, and blades mounted above said table and movable to clamp a blank on the table, means to fold the edges of said blank over and around the outer edges of said blades, sewing machines, folding mechanism between said sewing machines and said blades, said folding mechanism including hem guide members having edges in direct alignment with the edges of said blade, means for feeding said blank through said folding mechanism to a point adjacent said sewing machines, and means independent of said first feeding means to feed the edges of the blank from such point to the sewing machines.

57. In a machine of the character described, means to clamp a blank comprising a table, and blades movably mounted above said table, means to fold the edges of said blank over and around the outer edges of said blades, sewing machines, folding mechanism between said sewing machines and said blades, said folding mechanism including hem guide members having their edges in direct alignment with the edges of said blades, and means for feeding said blank through said folding mechanism to said sewing machines including feed jaws engageable with the edges of the blank, said folding mechanism having tracks therein through which said jaws enter to contact the blank.

58. In a machine of the character described, means to clamp a blank comprising a table, and blades movably mounted above said table, means to fold the edges of said blank over and around the outer edges of said blades, sewing machines, folding mechanism between said sewing machines and said blades, said folding mechanism including hem guide members having their edges in direct alignment with the edges of said blades, means for feeding said blank through said folding mechanism to a point adjacent said sewing machines including feed jaws engageable with the edges of the blank, said folding mechanism having tracks therein through which said jaws enter to contact the blank, and means independent of said first feeding means to feed the blank from such point to the sewing machines.

59. In a machine of the character described, means to clamp a blank comprising a table, and blades movably mounted above said table, means to fold the edges of said blank over and around the outer edges of said blades, sewing machines, folding mechanism between said sewing machines and said blades, said folding mechanism including hem guide members having their edges in direct alignment with the edges of said blades, means for feeding said blank through said folding mechanism to a point adjacent said sewing machines including feed jaws engageable with the edges of the blank said folding mechanism having tracks therein through which said jaws enter to contact the blank, and means independent of said first feeding means to feed the blank from such point to the sewing machines, said last means including a feed jaw in alignment with each track, and a second feed jaw inside said first feed jaw.

60. In a machine of the character described, means to cut a blank from a web, to fold the edges of said blank, sewing machines, folding mechanism between said sewing machines and said first folding means, means for feeding said blank through said folding mechanism to a point adjacent said sewing machines including feed jaws engageable with the edges of the blank, said folding mechanism having tracks therein through which said jaws enter to contact the blank, and means independent of said first feeding means to feed the blank from such point to the sewing machines, said last means including a feed jaw in alignment with each track, and a second feed jaw inside said first feed jaw.

61. In an apparatus of the class described, a table, said table having a shoulder along each edge thereof, clamping blades movably mounted above said table at the sides thereof, means to move said blades downwardly to engage the table at the points inside of and adjacent said shoulders to clamp a blank between the blades and the table, the height of said shoulders being slightly greater than the thickness of said clamping blades, folding blades mounted on said shoulders to turn about vertical axes adjacent one end of the table, means to swing said folding blades over said clamping blades to fold the edges of the blank over the clamping blades, sewing machines at the other end of the table, and means to feed said blank with its folded edges to the sewing machines, said sewing machines sewing the opposite edges of the blank simultaneously.

62. In an apparatus of the class described, a table, said table having a shoulder along one edge thereof, a clamping blade movably mounted above said table at the side thereof, means to move said blade downwardly to engage the table at points inside of and adjacent said shoulder to clamp a blank between the blade and the table, the height of said shoulder being slightly greater than the thickness of said clamping blade, a folding blade mounted on said shoulder to turn about a vertical axis adjacent one end of the table, means to swing said folding blade over said clamping blade to fold the edge of the blank over the clamping blade, a sewing machine at the other end of the table, means to feed said blank with its folded edge to the sewing machine, and folding mechanism for further folding the edge of the blanks during its movement to the sewing machine, said folding mechanism including a hem guide blade having its outer edge in alignment with the edge of said clamping blade.

63. In an apparatus of the class described, a table, means to feed a portion of a web of material across the table to form a blank, said table having a shoulder along each edge thereof, clamping blades movably mounted above the table at the sides thereof, means to move said blades downwardly to engage the table at points inside of and adjacent said shoulders, the height of said shoulders being slightly greater than the thickness of said clamping blades, folding blades mounted on said shoulders to turn about vertical axes adjacent one end of the table, means to cut the web outside of one of said shoulders to form a blank, and means to swing said folding blades over said clamping blades to fold the edges of the blank over the clamping blades.

64. In an apparatus of the class described, a table, means to feed a portion of a web of material across the table to form a blank, said table having a shoulder along each edge thereof, clamping blades movably mounted above the table at the sides thereof, means to move said blades downwardly to engage the table at points inside of and adjacent said shoulders, the height of said shoulders being slightly greater than the thickness of said clamping blades, folding blades mounted on said shoulders to turn about vertical axes adjacent one end of the table, means to cut the web outside of one of said shoulders to form a blank, means to swing said folding blades over said clamping blades to fold the edges of the blank over the clamping blades, sewing machines at the other end of the table, and means to feed said blank with its folded edges to the sewing machines, said sewing machines sewing the opposite edges of the blank simultaneously.

65. In an apparatus of the class described, a table, means to feed a portion of a web of material across the table to form a blank, said table having an opening centrally thereof, means movable downwardly through said opening to engage the web and deflect an intermediate part of the blank forming portion below the plane of the table, arms movably mounted above the table adjacent the sides thereof, said table having a shoulder along each edge thereof, clamping blades mounted on said arms, means to move said arms so as to swing said blades downwardly to engage the table at points inside of and adjacent said shoulders, the height of said shoulders being slightly greater than the thickness of said clamping blades, folding blades mounted on said shoulders to turn about vertical axes adjacent one end of the table, means to cut the web outside of one of said shoulders to form a blank, means to swing said folding blades over said clamping blades to fold the edges of the blank over the clamping blades, sewing machines at the other end of the table, means to feed said blank with its folded edges to the sewing machines, and folding mechanism for further folding the edges of the blanks during its movement to the sewing machines, said sewing machines sewing the opposite edges of the blank simultaneously.

66. In an apparatus of the class described, a table, means to feed a portion of a web of material across the table to form a blank, said table having an opening centrally thereof, means movable downwardly through said opening to engage the web and deflect an intermediate part of the blank forming portion below the plane of the table, arms movably mounted above the table adjacent the sides thereof, said table having a shoulder along each edge thereof, clamping blades mounted on said arms, means to move said arms so as to swing said blades downwardly to engage the table at points inside of and adjacent said shoulders, the height of said shoulders being slightly greater than the thickness of said clamping blades, folding blades mounted on said shoulders to turn about vertical axes adjacent one end of the table, means to cut the web outside of one of said shoulders to form a blank, means to swing said folding blades over said clamping blades to fold the edges of the blank over the clamping blades, sewing machines at the other end of the table, means to feed said blank with its folded edges to the sewing machines, and folding mechanism for further folding the edges of the blanks during its movement to the sewing machines, said folding mechanism including hem guide blades having their outer edges in alignment with the edges of said clamping blades, said sewing machines sewing the opposite edges of the blank simultaneously.

67. In a machine for making handkerchiefs or the like, means to feed from a web a measured length of material, means to cut the material from the web to form a blank, means to clamp the blank near its edges in the position in which it is cut off, and means to fold the edge portions of the blank substantially parallel to such edges while the blank is so clamped and held stationary by the clamping means.

68. In an apparatus of the class described, a sewing machine having a presser foot, means for cutting a blank from a web, means including a movable feed jaw for feeding the blank to a point adjacent the sewing machine, means for guiding an edge of the blank during such feeding movement and simultaneously folding such edge, and means independent of said first feeding means for engaging the black when it reaches the end of the movement of said first feeding means and carrying the same beneath the presser foot of the sewing machine, said last means comprising a pair of auxiliary feed jaws one of which is in alignment with the feed jaw of the first feed means and the other of which is spaced inwardly therefrom.

69. In an apparatus of the class described, sewing machines having presser feet, means for cutting a blank from a web and forming a slack between the edges thereof, means including movable feed jaws for feeding the blank to a point adjacent the sewing machines so that the same may sew simultaneously the edges of the blank, means for guiding the edges of the blank during such feeding movement and simultaneously folding the edges thereof, and means independent of said first feeding means for engaging the blank when it reaches the end of the movement of said first feeding means and carrying the same beneath the presser feet of the sewing machines, said last means comprising two pairs of auxiliary feed jaws, one jaw of each pair being in alignment with the feed jaw of the first feed means and the other being spaced inwardly therefrom.

70. In an apparatus of the class described, sewing machines having presser feet, means for cutting a blank from a web and forming a slack between the edges thereof, means including movable feed jaws for feeding the blank to a point adjacent the sewing machines so that the same may sew simultaneously the edges of the blank, means for guiding the edges of the blank during such feeding movement and simultaneously folding the edges thereof, and means independent of said first feeding means for engaging the blank when it reaches the end of the movement of said first feeding means and carrying the same beneath the presser feet of the sewing machines, said last means comprising two pairs of auxiliary feed jaws, one jaw of each pair being in alignment with the feed jaw of the first feed means and the other being spaced inwardly therefrom, means to operate said second feeding means, and means connected to said operating means to control the presser feet.

71. In an apparatus of the class described, sewing machines having presser feet, means for cutting a blank from a web, means for forming a slack between the edges of said blank, means for feeding the blank to a point adjacent the sewing machines, means for guiding the edges of the blank during such feeding movement and simultaneously folding the edges thereof, means independent of said first feeding means for engaging the blank when it reaches the end of the movement of said first feeding means and carrying the same beneath the presser foot of the sewing machine, means to operate said second feeding means, and means connected to said operating means to control the presser feet.

72. In a machine of the character described, sewing machines, means to cut off a blank from a web and form a slack therein, means for folding the edges of said blank and feeding the same to said sewing machines while maintaining the slack between the edges of the blank, and separate means for each sewing machine for stopping the machine operating on either edge of the blank individually and independently of the other machine when the end of the blank edge on which that machine is operating passes out from beneath the presser foot thereof.

73. In a machine of the character described, sewing machines, means to cut off blanks from a web and form slack therein, means for folding the edges of said blanks and feeding them successively to said sewing machines while maintaining the slack between the edges of the blanks, separate means for each sewing machine for stopping the machine operating on either edge of the blank individually and independently of the other machine when the end of a blank edge on which that machine is operating passes out from beneath the presser foot thereof, and means for restoring both of said machines to operation simultaneously when the following blank is fed thereto.

74. In a machine of the class described, a frame, a table mounted on said frame extending longitudinally thereof, said table having sewing machines located at one end thereof, means to feed a web across said table, means to clamp the blank portion of the web on the table, means to cut the blank from the web, means to fold the edges of the blank while it is held by the clamping means, main feeding jaws, means to move said feeding jaws to a point adjacent to but slightly spaced from the presser feet of the sewing machines, folding mechanism, said folding mechanism including means to fold under the inner edges of the folds formed by said first folding means, said folding mechanism having slots along the top thereof through which said feeding jaws engage the blank to feed the same therethrough, pairs of auxiliary feed jaws mounted adjacent said sewing machines, the outer of each pair of said auxiliary jaws being substantially in line with one of the main feeding jaws, and means to move said auxiliary feeding jaws both horizontally and vertically to take up the blank from the main feeding jaws and feed it beneath the presser feet of the sewing machines.

75. In a machine of the class described, a frame, a table mounted on said frame extending longitudinally thereof, said table having sewing machines located at one end thereof, means to feed a web across said table, means to clamp the blank portion of the web on the table, means to cut the blank from the web, means to fold the edges of the blank while it is held by the clamping means, means to feed the blank to a point adjacent to but slightly spaced from the presser feet of the sewing machines, folding mechanism between said folding means and the sewing machines, said folding mechanism including means to fold under the inner free edges of the folds formed by said first folding means, auxiliary feeding means mounted adjacent said sewing machines, and means to move said auxiliary feeding means both horizontally and vertically to take up the blank from the main feeding means and feed it beneath the presser feet of the sewing machines.

76. In a machine of the class described, a frame, a table mounted on said frame extending longitudinally thereof, said table having sewing machines located at one end thereof, means to feed a web across said table, means to clamp the blank portion of the web on the table, means to cut the blank from the web, means to fold the edges of the blank while it is held by the clamping means, gear members mounted on said frame to turn about a transverse axis, means to impart oscillatory movement to said gear members, racks engageable with said gear members, blocks carried by said racks at the sides thereof, feeding members vertically slidably mounted in said blocks, main feeding jaws carried by said feeding members, spring means normally urging said feed members downwardly to engage the blank, shafts extending longitudinally above said table, arms carried by said shafts, rods mounted on the ends of said arms, rollers on said feeding members engaging said rods, and means to turn said shafts to raise and lower said feeding jaws into and out of engagement with the blank, folding mechanism, said folding mechanism including means to fold under the inner free edges of the folds formed by said first folding means, said folding mechanism having slots along the top thereof through which said feeding jaws engage the blank to feed the same therethrough.

77. In a machine of the class described, a frame, a table mounted on said frame extending longitudinally thereof, said table having sewing machines located at one end thereof, means to feed a web across said table, means to form slack in said web, shoulders at the sides of said table, means to clamp the blank portion of the web on the table comprising blades at opposite sides of the table, means to move said clamping blades downward to points within but adjacent said shoulders, said shoulders being of a height slightly greater than the thickness of said clamping blades, means to cut the blank from the web, folding blades on said shoulders mounted to turn about vertical axes located adjacent the end of the table, whereby said folding blades are arranged in planes higher than the surfaces of the clamping blades, means to swing said blades inwardly above the clamping blades to fold the edges of the blank over the clamping blades, main feeding jaws, said feeding jaws being located slightly nearer the center of the table than the edges of said clamping blades, means to move said feeding jaws from a point over the inner ends of said clamping blades to a point adjacent to but slightly spaced from the presser feet of the sewing machines, folding mechanism between the ends of the clamping blades and the sewing machines, said folding mechanism including hem guide blades the edges of which are substantially aligned with the outer edges of the clamping blades, said folding mechanism further including means to fold under the inner free edges of the folds formed by said folding blades, said folding mechanism having slots along the top thereof through which said feeding jaws engage the blank to feed the same therethrough, pairs of auxiliary feeding jaws mounted adjacent said sewing machines, the outer of each pair of said auxiliary jaws being substantially in line with one of the main feeding jaws, and means to move said auxiliary feeding jaws both horizontally and vertically to take up the blank from the main feeding jaws and feed it beneath the presser foot of the sewing machine.

GUSTAVE A. ANDERSON.